United States Patent
Jeong et al.

(10) Patent No.: US 11,185,203 B2
(45) Date of Patent: Nov. 30, 2021

(54) ROBOT CLEANER, CHARGING DEVICE AND CHARGING SYSTEM

(71) Applicant: Samsung Electronics Co., Ltd., Suwon-si (KR)

(72) Inventors: Yeon Kyu Jeong, Suwon-si (KR); Hee Suk Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 16/567,232

(22) Filed: Sep. 11, 2019

(65) Prior Publication Data

US 2020/0093342 A1    Mar. 26, 2020

(30) Foreign Application Priority Data

Sep. 21, 2018   (KR) .................. 10-2018-0113904

(51) Int. Cl.
*A47L 9/00*   (2006.01)
*A47L 9/28*   (2006.01)
(Continued)

(52) U.S. Cl.
CPC ......... *A47L 9/2873* (2013.01); *A47L 11/4005* (2013.01); *H01M 10/46* (2013.01);
(Continued)

(58) Field of Classification Search
CPC ............... A47L 9/2873; A47L 11/4005; A47L 2201/022; H02J 7/00; H02J 7/0045; H01M 10/46; H01M 2220/20
See application file for complete search history.

(56) References Cited

U.S. PATENT DOCUMENTS 8,800,101 B2 *   8/2014   Kim ..................... A47L 9/2805
                                                            15/319
10,031,527 B2 *  7/2018   Bjorn .................. G05D 1/0038
(Continued)

FOREIGN PATENT DOCUMENTS

EP   1 926 006 B1   6/2013
EP   2 613 215 A1   7/2013
(Continued)

OTHER PUBLICATIONS

International Search Report dated Jan. 17, 2020, issued in an International Application No. PCT/KR2019/011997.
(Continued)

*Primary Examiner* — Naum Levin
(74) *Attorney, Agent, or Firm* — Jefferson IP Law, LLP

(57) ABSTRACT

A robot cleaner and a charging device capable of determining whether contact is made between charging terminals of the charging device and the robot cleaner are provided. The charging device may include a charging circuit including at least one terminal having at least a portion exposed to the outside, at least one object sensor to detect at least one identification object arranged in a robot cleaner, the at least one object sensor being arranged separately from the at least one terminal configured, and at least one processor configured to control the charging circuit to apply a voltage to the at least one terminal in response to the at least one object sensor detecting the at least one identification object.

14 Claims, 30 Drawing Sheets

(51) Int. Cl.
  *A47L 11/40* (2006.01)
  *H01M 10/46* (2006.01)
  *H02J 7/00* (2006.01)

(52) U.S. Cl.
  CPC .............. *H02J 7/00* (2013.01); *H02J 7/0045* (2013.01); *A47L 2201/02* (2013.01); *A47L 2201/022* (2013.01); *H01M 2220/20* (2013.01); *Y10S 901/01* (2013.01)

(56) References Cited

U.S. PATENT DOCUMENTS

| | | | |
|---|---|---|---|
| 10,132,647 B2* | 11/2018 | Blanchard | G01C 25/005 |
| 10,566,734 B1* | 2/2020 | Pabouctsidis | H01R 12/7005 |
| 10,575,696 B2* | 3/2020 | O'Brien | A47L 9/0477 |
| 10,952,578 B2* | 3/2021 | Gill | A47L 9/1683 |
| 2004/0088081 A1 | 5/2004 | Song et al. | |
| 2017/0100007 A1* | 4/2017 | Matsumoto | A47L 9/2894 |
| 2018/0014709 A1 | 1/2018 | O'Brien et al. | |
| 2018/0116478 A1* | 5/2018 | Lewis | A47L 9/1409 |
| 2018/0370377 A1* | 12/2018 | Blacksberg | G05D 1/0231 |
| 2019/0136563 A1* | 5/2019 | Crandall | E05B 65/0021 |
| 2019/0278269 A1* | 9/2019 | He | G05D 1/0022 |
| 2020/0060491 A1* | 2/2020 | Lin | A47L 9/2805 |
| 2020/0275815 A1* | 9/2020 | Furuta | A47L 9/0063 |
| 2020/0306989 A1* | 10/2020 | Vogel | G05D 1/0261 |

FOREIGN PATENT DOCUMENTS

| | | |
|---|---|---|
| KR | 1020040061322 A | 7/2004 |
| KR | 1020060034327 A | 4/2006 |
| KR | 1020060097789 A | 9/2006 |
| KR | 10-1297194 B1 | 8/2013 |
| KR | 1020180060339 A | 6/2018 |

OTHER PUBLICATIONS

European Search Report dated Sep. 6, 2021, issued in European Application No. 19863604.5.

\* cited by examiner

ROBOT CLEANER, CHARGING DEVICE AND CHARGING SYSTEM

CROSS-REFERENCE TO RELATED APPLICATION(S)

This application is based on and claims priority under 35 U.S.C. § 119 of a Korean patent application number 10-2018-0113904, filed on Sep. 21, 2018, in the Korean Intellectual Property Office, the disclosure of which is incorporated by reference herein in its entirety.

BACKGROUND

1. Field

The disclosure relates to a robot cleaner, charging device, and charging system. More particularly, the disclosure relates to a robot cleaner capable of identifying docking of the robot cleaner with a charging device, and the charging device and charging system capable of identifying docking of the robot cleaner.

2. Description of Related Art

Typically, a robot cleaner is a device that automatically cleans a room by sucking up impurities, such as dust on the floor while autonomously moving about the room without user intervention. That is, the robot cleaner cleans the room while moving around the room.

The robot cleaner includes a battery. Electrical energy stored in the battery enables the robot cleaner to move and suck up the dust in the room.

Further, there is a charging device provided to charge the battery when the battery is discharged. The charging device may be fixedly placed, and the robot cleaner may go to the charging device when the battery is running low on charge voltage while the robot cleaner is moving around the room.

The robot cleaner includes a pair of charging terminals exposed to the outside for charging the battery, and the charging device also includes a pair of exposed charging terminals. When the pair of charging terminals of the charging device contact the pair of charging terminals of the robot cleaner, the charging device starts to charge the battery of the robot cleaner.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a robot cleaner, charging device, and charging system capable of determining whether contact is made between charging terminals of the charging device and the robot cleaner.

Another aspect of the disclosure is to provide a robot cleaner, charging device, and charging system capable of determining whether contact is made between charging terminals of the charging device and the robot cleaner while no voltage is applied by the charging device to its charging terminal.

Another aspect of the disclosure is to provide a robot cleaner, charging device, and charging system, which prevents the charging device from applying a voltage to its charging terminal while the charging terminal is exposed to the outside.

Additional aspects will be set forth in part in the description which follows and, in part, will be apparent from the description, or may be learned by practice of the presented embodiments.

In accordance with an aspect of the disclosure, a charging device is provided. The charging device includes a charging circuit including at least one terminal, at least a portion of the at least one terminal being exposed to the outside, at least one object sensor configured to detect at least one identification object arranged in a robot cleaner, the at least one object sensor being arranged separately from the at least one terminal and configured, and at least one processor configured to control the charging circuit to apply a voltage to the at least one terminal in response to the at least one object sensor detecting the at least one identification object.

In accordance with another aspect of the disclosure, a robot cleaner is provided. The robot cleaner includes a battery, a charging circuit including at least one terminal, at least a portion of the at least one terminal being exposed to the outside, at least one object sensor to detect at least one identification object arranged at a charging device, the at least one object sensor being arranged separately from the at least one terminal, and at least one processor configured to control the charging circuit to charge the battery with a voltage applied to the at least one terminal from the charging device in response to the at least one object sensor detecting the at least one identification object.

In accordance with another aspect of the disclosure, a charging system is provided. The charging system includes a robot cleaner including a battery and a first docking identifier, and a charging device including a charging circuit arranged to charge the battery and a second docking identifier arranged in a position corresponding to the first docking identifier, wherein the charging device charges the battery with the charging circuit in response to one of the first or second docking identifier detecting the other of the first or second docking identifier.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other objects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
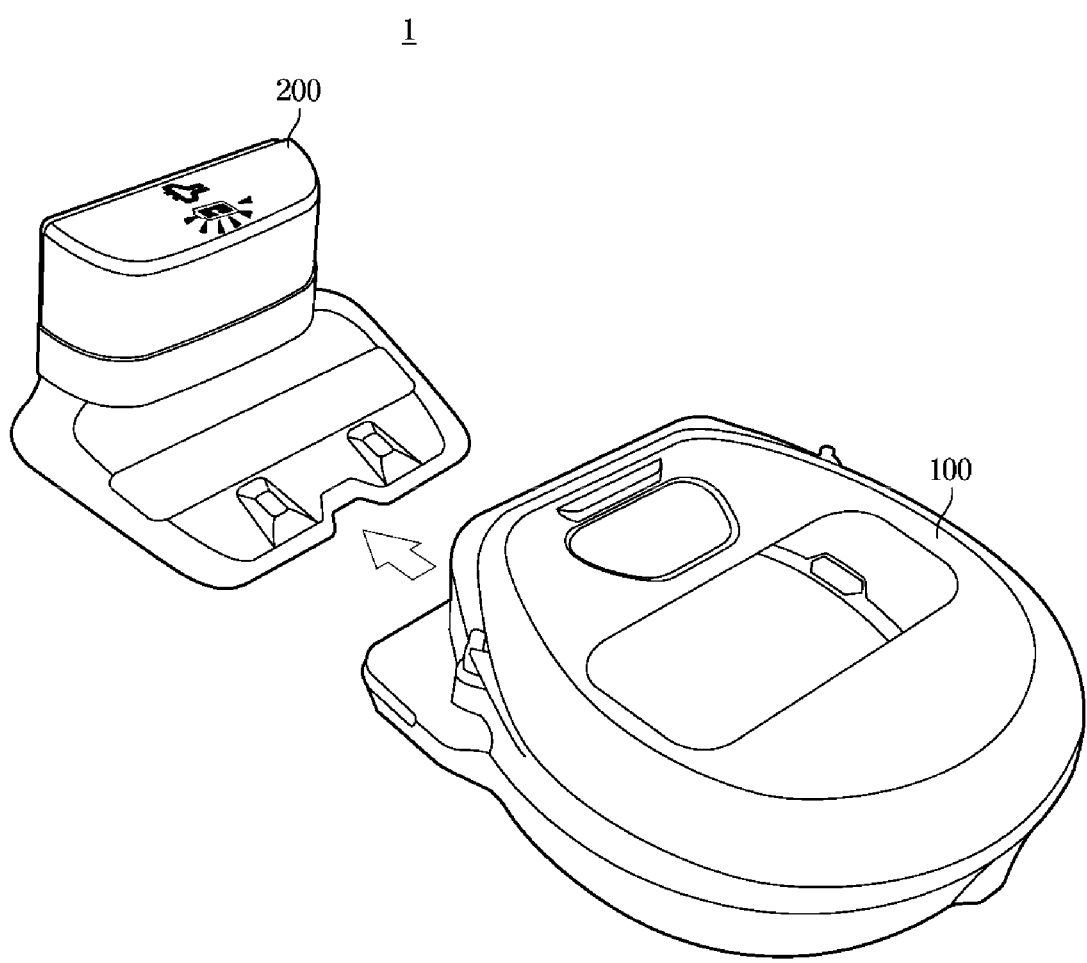
FIG. 1 shows a robot cleaner and a charging device, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skill in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the embodiments of the disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

The principle and embodiments of the disclosure will now be described with reference to accompanying drawings.

FIG. 1 shows a robot cleaner and a charging device, according to an embodiment of the disclosure.

Referring to FIG. 1, a cleaning device 1 includes a robot cleaner 100 and a charging device 200.

The robot cleaner 100 may clean the floor of space to be cleaned while moving about the room. The space to be cleaned is not particularly limited, and may be any space around which the robot cleaner 100 moves and cleans. For example, the space may include not only an indoor space such as a room, a living room, a hallway, an office room, or the inside of a gym but also an outdoor space.

The robot cleaner 100 may include a battery to use electrical energy stored in the battery to move itself around the space and clean the floor of the space. The electrical energy of the battery is consumed and the output voltage of the battery is reduced, while the robot cleaner 100 is moving around the space and cleaning the floor.

The robot cleaner 100 may operate normally at a voltage equal to or higher than a preset minimum voltage, and may not operate at a voltage lower than the minimum output voltage of the battery. Hence, when the output voltage of the battery is reduced near to the minimum voltage, the robot cleaner 100 may move to the charging device 200 for charging the battery.

The charging device 200 may convert alternate current (ac) power received from an external power source (e.g., a domestic ac power source) to direct current (dc) power, and supply the dc power to the robot cleaner 100 to charge the battery of the robot cleaner 100.

The charging device 200 is fixed at a certain position (e.g., a place set by the user), and is settled unless it is under a special circumstance (e.g., an occasion when the user moves the charging device 200 to another position). As the charging device 200 is located at a set place, the robot cleaner 100 may move to the charging device 200 to charge its battery when the output voltage of the battery comes close to the minimum voltage while the robot cleaner 100 is moving around the space.

The robot cleaner 100 includes a charging terminal exposed to the outside for charging the battery. The charging device 200 may include a charging terminal exposed to the outside for charging the battery of the robot cleaner 100. When the charging terminal of the charging device 200 contacts the charging terminal of the robot cleaner 100, the charging device 200 may apply a voltage to its charging terminal, and the robot cleaner 100 may charge the battery with the voltage applied across the charging terminal of the charging device 200.

The charging device 200 may use a non-contact type sensor or contact type sensor to identify whether the charging terminal of the charging device 200 contacts the charging terminal of the robot cleaner 100. The robot cleaner 100 may also use a non-contact type sensor or contact type sensor to identify whether the charging terminal of the charging device 200 contacts the charging terminal of the robot cleaner 100.

Configurations and operations of the robot cleaner 100 and the charging device 200 will now be described in detail.

Figure 2:
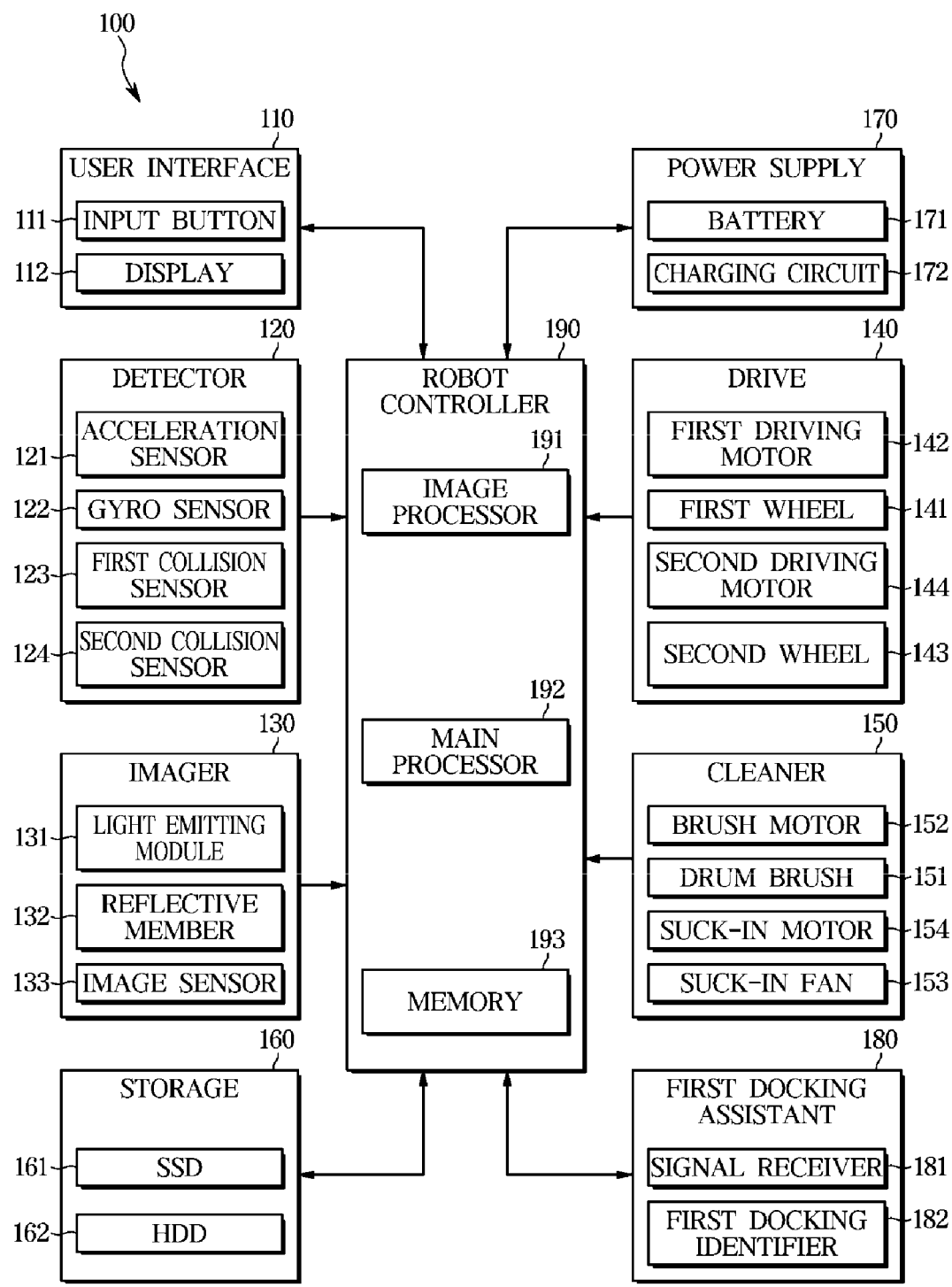
FIG. 2 is a block diagram of a robot cleaner, according to an embodiment of the disclosure.
Figure 3:
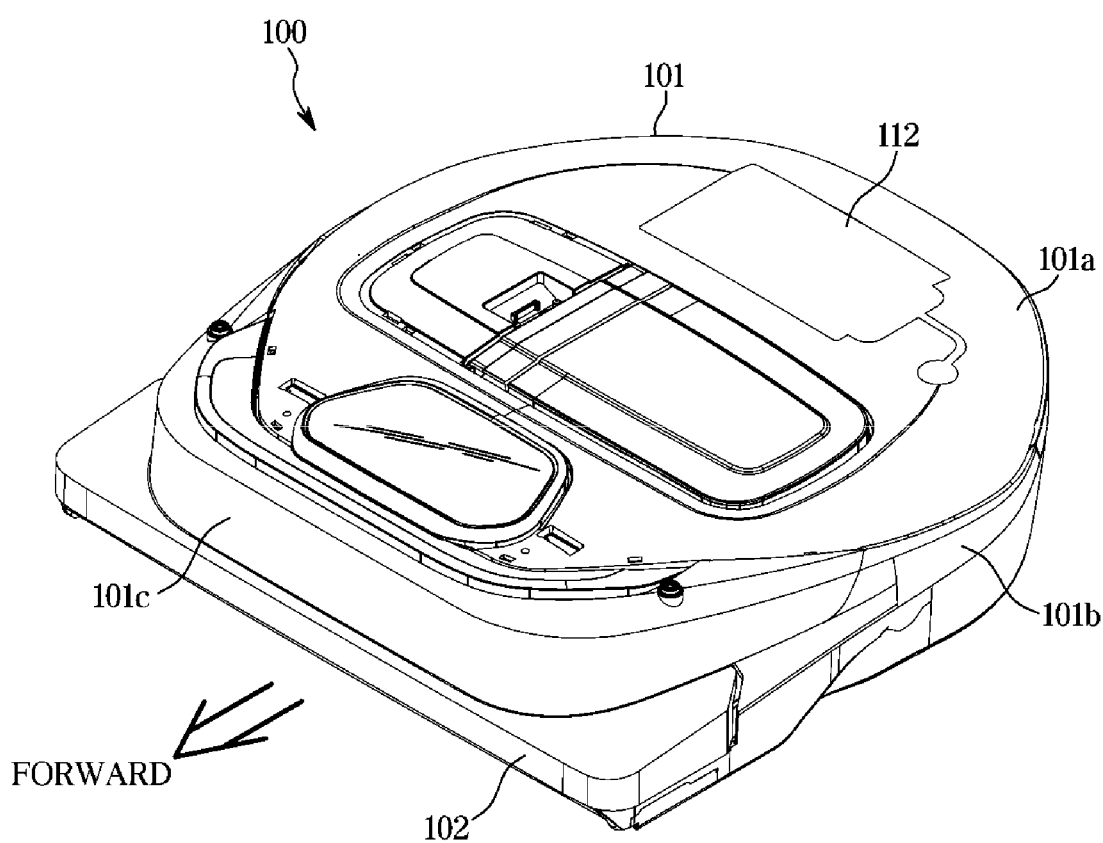
FIG. 3 is an exterior view of a robot cleaner, according to an embodiment of the disclosure.
Figure 4:
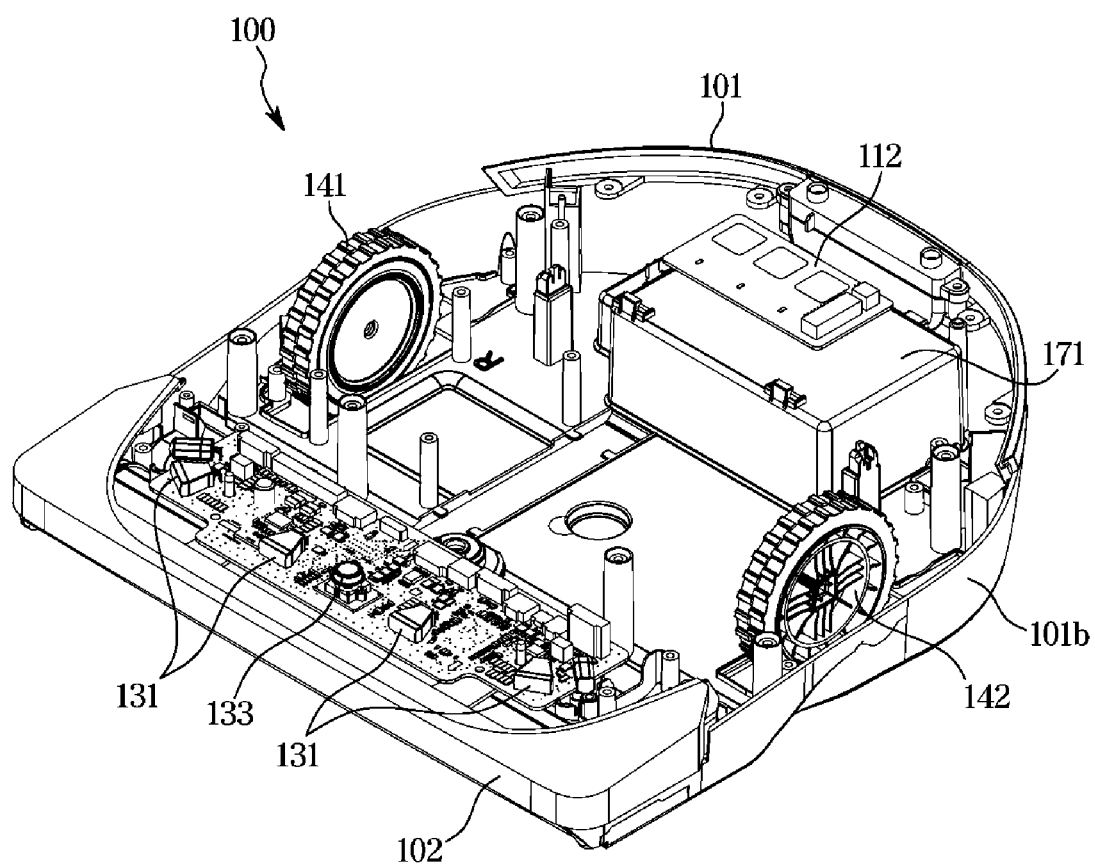
FIG. 4 is an interior view of a robot cleaner, according to an embodiment of the disclosure.
Figure 5:
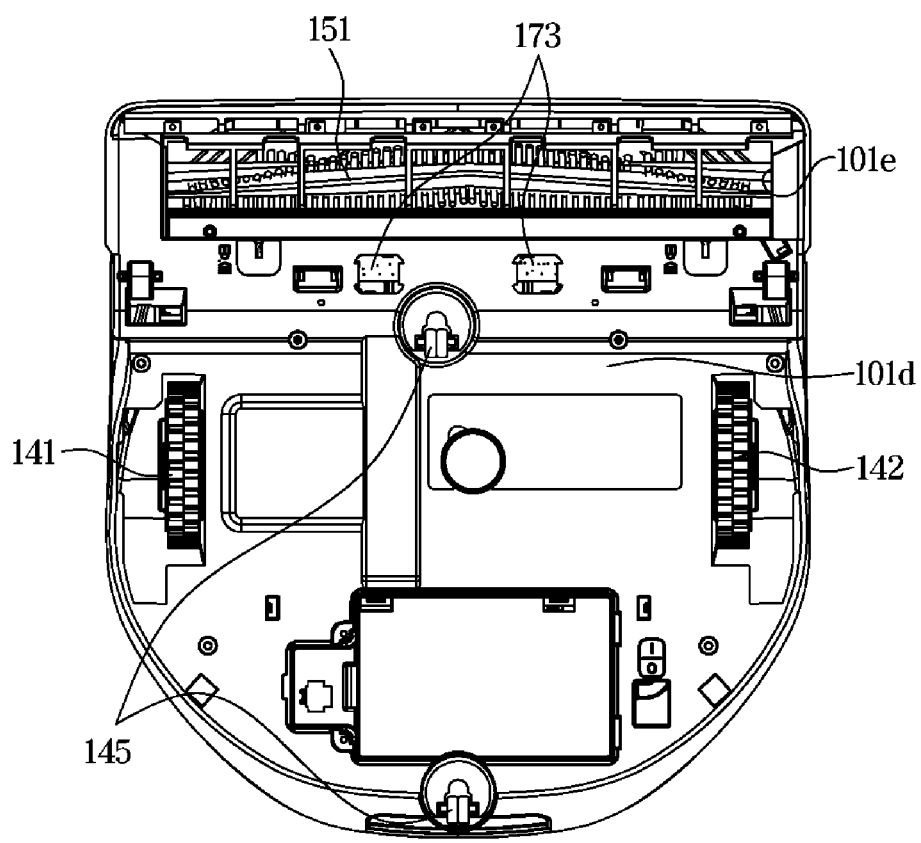
FIG. 5 shows the bottom of a robot cleaner, according to an embodiment of the disclosure.
Figure 6:
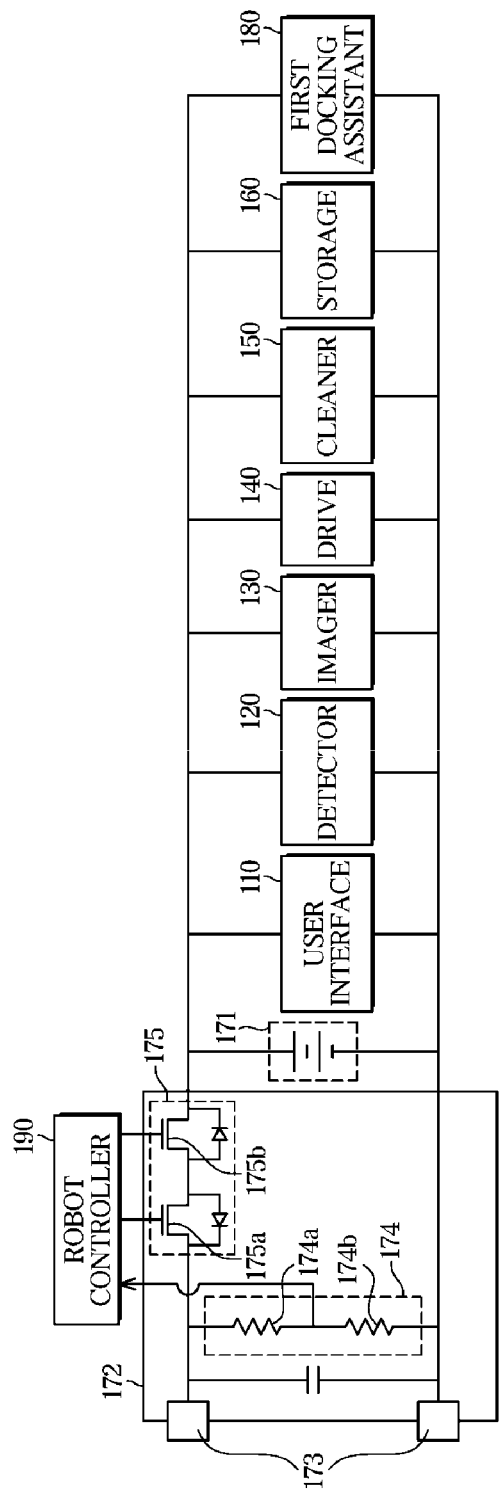
FIG. 6 shows configuration of a power supply included in a robot cleaner, according to an embodiment of the disclosure.

FIG. 2 is a block diagram of a robot cleaner, according to an embodiment of the disclosure. FIG. 3 is an exterior view of a robot cleaner, according to an embodiment of the disclosure. FIG. 4 is an interior view of a robot cleaner, according to an embodiment of the disclosure. FIG. 5 shows the bottom of a robot cleaner, according to an embodiment of the disclosure. FIG. 6 shows configuration of a power supply included in a robot cleaner, according to an embodiment of the disclosure.

Referring to FIGS. 2 to 6, the robot cleaner 100 may include a main body 101 and a bumper 102 arranged on the front of the main body 101.

The main body 101 may have a substantially cylindrical shape, as shown in FIG. 3. Specifically, the main body 101 may include a top face 101a almost circular in shape and a side face 101b formed along the edges of the top face 101a.

At least a portion of the side face 101b of the main body 101 may be flat. For example, a front face 101c formed on the front of the main body 101 may be substantially flat.

The bumper 102 may be formed on the front face 101c and may be flat on the front. The main body 101 may have a substantially cylindrical shape and the bumper 102 has the substantially flat side, so a bottom face 101d of the robot cleaner 100 may have nearly a combined shape of a half circle and a rectangle, as shown in FIG. 5.

The bumper 102 may reduce the impact of a collision with an obstacle on the main body 101 and may detect the collision. The obstacle may include an object, a person, or an animal that obstructs the way of the robot cleaner 100. For example, the obstacle may include a wall dividing the space, furniture located in the space, or an individual or animal present in the space.

The robot cleaner 100 may generally move with the bumper 102 facing forward, and as shown in FIG. 2, a direction in which the bumper 102 is headed may be defined as a 'forward direction' of the robot cleaner 100.

The robot cleaner 100 may include components arranged inside and outside of the main body 101 to implement (moving and cleaning) capabilities of the robot cleaner 100.

Specifically, the robot cleaner 100 may include a user interface 110, a detector 120, an imager 130, a drive 140, a cleaner 150, a storage 160, a power supply 170, a first docking assistant 180, and a robot controller 190.

The components included in the robot cleaner 100 are not limited thereto, but may add some other components or omit some of the aforementioned components. Furthermore, the names of the components included in the robot cleaner 100 are not limited to what are called above. Each of the components included in the robot cleaner 100 may be also referred to as another name that indicates what performs the same function.

The user interface 110 may be arranged on the top face 101a of the main body 101, as shown in FIG. 3, and may include input buttons 111 and a display 112.

The input buttons 111 may receive control commands from the user. The input buttons 111 may include a power button for tuning on or off the robot cleaner 100, an operation button for starting or stopping operation of the robot cleaner 100, and a return button for returning the robot cleaner 100 to the charging device 200 for charging.

The input buttons 111 may include a push switch and a membrane switch each activated by the pressure of the user, or a touch switch activated by the touch of a body part of the user.

The display 112 displays operational information of the robot cleaner 100 in response to an input entered by the user through the input buttons 111. For example, the display 112 may display an operation state of the robot cleaner 100, a battery charge state, a cleaning mode selected by the user, indication of whether to return to the charging device 200, etc.

The display 112 may include a Light Emitting Diode (LED) panel, an Organic Light Emitting Diode (OLED) panel, a Liquid Crystal Display (LCD) panel, or the like.

Alternatively, the display 112 may include a touch screen panel (TSP) for receiving control commands from the user and display operational information corresponding to the received control command. The TSP may include a display for displaying operational information and control commands that the user may enter, a touch panel for detecting coordinates that comes in contact with a body part of the user, and a touch screen controller for determining a control command entered by the user based on the coordinates of contact detected by the touch panel. The touch screen controller may recognize the control command entered by the user by comparing the coordinates touched by the user detected by the touch panel and the coordinates of the control command displayed through the display.

The detector 120 may include an acceleration sensor 121 and a gyro sensor 122 for detecting motion of the robot cleaner 100.

The acceleration sensor 121 and the gyro sensor 122 may measure acceleration, moving velocity, motion displacement, and a moving direction of the robot cleaner 100 while the robot cleaner 100 is linearly moving. The acceleration sensor 121 and the gyro sensor 122 may measure rotational speed, rotational displacement, and a rotation radius while the robot cleaner 100 is turning around.

The acceleration sensor 121 may detect linear motion. For example, the acceleration sensor 121 may measure linear acceleration, linear velocity, linear displacement, and the like of the robot cleaner 100 by using the Newton's second law of motion (the law of acceleration).

The acceleration sensor 121 may include a Micro Electro Mechanical System (MEMS) type sensor miniaturized by combining micro mechanical, micro electronic, and semiconductor process technologies.

The gyro sensor 122 may also be referred to as a gyroscope or an angular sensor that detects turning motion of the robot cleaner 100. Specifically, the gyro sensor 122 may measure angular velocity and displacement of rotation of a target by using the law of angular momentum conservation, Sagnac effect, Coriolis force, etc.

The gyro sensor 122 may also include an MEMS type sensor. For example, of the MEMS type gyro sensors, a capacitive gyro sensor may detect tiny deformation of a mechanical structure due to the Coriolis force proportional to a rotational velocity as a change in capacitance, and derive the rotational speed from the change in capacitance.

The detector 120 may further include an encoder or hall sensor for detecting rotation of the wheel of the robot cleaner 100 to detect the motion of the robot cleaner 100. The encoder or hall sensor may detect rotation of a first wheel 141 and/or a second wheel 143 of the drive 140. Based on the rotation of the first wheel 141 and/or the second wheel 143, motion of the robot cleaner 100 may be determined.

The detector 120 may send information about the motion of the robot cleaner 100 detected by the acceleration sensor 121 and/or the gyro sensor 122 to the robot controller 190.

The detector 120 may also include a first collision sensor 123 and a second collision sensor 124 for detecting a collision with an obstacle.

The first and second collision sensors 123 and 124 may be arranged at different locations on the bumper 102, and may detect collisions in different directions.

For example, the first collision sensor 123 may be arranged on the left of the bumper 102, and the second collision sensor 124 may be arranged on the right of the bumper 102. The first collision sensor 123 may detect a collision of the bumper 102 with an obstacle on the front left side, and the second collision sensor 124 may detect a collision of the bumper 102 with an obstacle on the front right side.

The first and second collision sensors 123 and 124 may include micro switches activated by relative movement of the bumper 102 due to the collision. The bumper 102 may be moved to the rear right of the main body 101 due to a collision with an obstacle on the front left side, and may activate the micro switch of the first collision sensor 123. The bumper 102 may be moved to the rear left of the main body 101 due to a collision with an obstacle on the front right side, and may activate the micro switch of the second collision sensor 124.

The first and second collision sensors 123 and 124 may send a collision signal to the robot controller 190 in response to a collision with an obstacle.

The imager 130 may acquire an image looking forward and/or upward from the robot cleaner 100 (hereinafter, referred to as a forward image and/or an upward image). The robot cleaner 100 may identify an obstacle in a moving path based on the forward image, and identify a location of the robot cleaner 100 based on the upward image.

The imager 130 may include a light emitting module 131, a reflecting member 132, and an image sensor 133.

The image sensor 133 may acquire an image. The image sensor 133 may include photo diodes that convert an optical image into an electric image data. For example, the image sensor 133 may include a photo diode array in which photo diodes are arranged in two dimension (2D). The image sensor 133 may further include a lens that focuses light onto the photo diode array.

The image sensor 133 may look upward, as shown in FIG. 4. For example, the image sensor 133 may be arranged such that the lens and the photo diode array look upward from the robot cleaner 100. At least a portion of the image sensor 133 may acquire the upward image of the robot cleaner 100.

The image sensor 133 may include photo diodes for detecting infrared rays, and thus acquire an infrared image. It is not, however, limited thereto, and the image sensor 133 may acquire a visible ray image or an ultraviolet image.

The image sensor 133 may include a Complementary Metal Oxide Semiconductor (CMOS) sensor or a Charge Coupled Device (CCD) sensor.

The light emitting module 131 may emit light forward from the robot cleaner 100. For example, the light emitting module 131 may include a light emitting diode (LED) to emit light. The light emitting module 131 may further include a wide-angle lens that spreads the light emitted from the LED to directions parallel to the floor.

The LED may emit infrared rays. It is not, however, limited thereto, and the LED may emit visible rays or ultraviolet rays.

The wide-angle lens may be made of a light-transmitting material, and may spread the light emitted from the LED to the direction parallel to the floor through refraction or total reflection. With the wide-angle lens, the light emitted from the LED may be spread forward from the robot cleaner 100 in the form of a sector.

The reflecting member 132 may be provided on the top of the image sensor 133, and may reflect light incident thereon from the forward direction of the robot cleaner 100 toward the image sensor 133.

The light emitted from the light emitting module 131 may travel in all directions of the robot cleaner 100. When an obstacle is located in front of the robot cleaner 100, the obstacle reflects the light and a portion of the light may be incident onto the robot cleaner 100. The reflecting member 132 may reflect the light reflected from the obstacle to the image sensor 133.

At least a portion of the image sensor 133 may thus acquire an image from the light reflected from the obstacle. In other words, at least a portion of the image sensor 133 may acquire the forward image of the robot cleaner 100 including the obstacle located in front of the robot cleaner 100.

The image sensor 133 may acquire the upward image and the forward image of the robot cleaner 100, the forward image including an obstacle, and send image data corresponding to the upward image and the forward image to the robot controller 190.

The drive 140 may move the robot cleaner 100 in response to a control signal from the robot controller 190. The drive 140 may include the first wheel 141, the second wheel 143, a first driving motor 142, and a second driving motor 144.

As shown in FIG. 5, the first wheel 141 may be installed on the left of the bottom face 101*d* of the robot cleaner 100, and the second wheel 143 may be installed on the right of the bottom face 101*d* of the robot cleaner 100. The first driving motor 142 may rotate the first wheel 141, and the second driving motor 144 may rotate the second wheel 143.

The first and second driving motors 142 and 144 may rotate the first and second wheels 141 and 143, respectively, upon reception of a control signal from the robot controller 190. Furthermore, the first wheel 141 may be rotated by the first driving motor 142 independently from the rotation of the second wheel 143, and the second wheel 143 may be rotated by the second driving motor 144 independently from the rotation of the first wheel 141.

These separate rotations of the first and second wheels 141 and 143 may enable the robot cleaner 100 to move in various forms, such as move forward, move backward, turn around, turn in the same place, etc. For example, when the first and second wheels 141 and 143 are rotated in the same direction at the same speed, the robot cleaner 100 may move forward or move backward. When the first and second wheels 141 and 143 are rotated in the same direction at different speeds, the robot cleaner 100 may curve to the left or to the right. Furthermore, when the first and second wheels 141 and 143 are rotated in different directions at the same speed, the robot cleaner 100 may turn clockwise or counterclockwise in the same place.

The drive 140 may further include parts 145 installed on the bottom face 101*d* of the main body 101. As the robot cleaner 100 moves, rotation shafts of the parts 145 may be rotated, and may, accordingly, support the main body 101 without interfering with the motion of the robot cleaner 100.

Furthermore, the drive 140 may include a driving circuit for applying a driving current to each of the first and second driving motors 142 and 144 in response to a control signal from the robot controller 190, a power transferrer for transferring the rotation of the first and second driving motors 142 and 144 to the first and second wheels 141 and 143, respectively, and a rotation sensor, e.g., an encoder, hall sensor, or the like, for detection rotation of the first and second wheels 141 and 143.

The cleaner 150 includes a drum brush 151, a brush motor 152, a suck-in fan 153, and a suck-in motor 154.

The drum brush 151 is arranged in a dust inlet 101*e* formed at the bottom face 101*d* of the main body, as shown in FIG. 5. The drum brush 151 may scatter the dust on the floor into the dust inlet 101*e* while being rotated around a rotation shaft arranged in parallel with the floor.

The brush motor 152 may be arranged to be adjacent to the drum brush 151 for rotating the drum brush 151 in response to a control signal from the robot controller 190.

The brush motor 152 may drive the drum brush 151 to be rotated forward (such that a contact part between the drum brush 151 and the floor is moved from front to back) or backward (such that the contact part between the drum brush 151 and the floor is moved from back to front) based on the moving direction of the robot cleaner 100. For example, when the robot cleaner 100 moves forward, the brush motor 152 may drive the drum brush 151 to be rotated forward, and when the robot cleaner 100 moves backward, the brush motor 152 may drive the drum brush 151 to be rotated backward.

The cleaner 150 may further include a driving circuit for supplying a driving current to the brush motor 152 in response to a control signal from the robot controller 190, and a power transferrer for transferring rotational force of the brush motor 152 to the drum brush 151.

The suck-in fan 153 may be provided inside the main body 101 for sucking up the dust scattered by the drum brush 151.

The suck-in motor 154 may be mounted near the suck-in fan 153 for rotating the suck-in fan 153 according to a control signal from the robot controller 190.

The cleaner 150 may further include a driving circuit for supplying a driving current to the suck-in motor 154 in response to a control signal from the robot controller 190, and a power transferrer for transferring turning force of the suck-in motor 154 to the suck-in fan 153.

Furthermore, the cleaner 150 may include a dust container for storing the dust sucked in by the suck-in fan 153.

The storage 160 may store a control program and control data for controlling operation of the robot cleaner 100 and store various application programs and application data for performing various functions in response to inputs from the user. For example, the storage 160 may include an operating system (OS) program for managing configurations and resources (in software and/or hardware) included in the robot cleaner 100, an image processing program for processing image data acquired by the imager 130, a motor control program for controlling the first and second driving motors 142 and 144 included in the drive 140, etc.

The storage 160 may serve as an auxiliary memory device of a memory 193 included in the robot controller 190. For example, part of data stored in the memory 193 may be stored in the storage 160.

The storage 160 may store a driving record created by the driving of the robot cleaner 100, and map data created based on the driving record. For example, the storage 160 may store driving records, such as a moved distance, a moving direction, moving speed, etc., detected by the detector 120 while the robot cleaner 100 is moving. The storage 160 may store the map data created by the robot controller 190 based on the driving record.

The storage 160 may include a non-volatile memory that preserves the stored program or data even if the power is out. For example, the storage 160 may include a solid state drive (SSD) 161, a hard disc drive (HDD) 162, or the like.

The power supply 170 includes a battery 171 and a charging circuit 172.

The battery 171 may store electrical energy to move the robot cleaner 100. The battery 171 may convert the electrical energy to chemical energy and store the chemical energy. This is called the battery 171 being charged. Furthermore, the battery 171 may convert the chemical energy to electrical energy and output the electrical energy (in a voltage and current). This is called the battery 171 being discharged.

For example, when a voltage applied by an external circuit to the battery 171 is higher than an output voltage of the battery 171, the battery 171 may be charged, and when a voltage applied by the external circuit to the battery 171 is lower than an output voltage of the battery 171, the battery 171 may be discharged.

The battery 171 may supply the electrical energy to the electric components included in the robot cleaner 100. Specifically, the battery 171 may apply a voltage and current to the user interface 110, the detector 120, the imager 130, the drive 140, the cleaner 150, the storage 160, the first docking assistant 180, and the robot controller 190.

The charging circuit 172 may charge the battery 171 with the power supplied from the charging device 200. The charging circuit 172 includes a first charging terminal 173 that comes into contact with the charging device 200 to receive power from the charging device 200, a divider 174 for detecting the voltage applied to the first charging terminal 173, and a switch 175 that allows or blocks the connection between the first charging terminal 173 and the battery 171.

The first charging terminal 173 may contact the charging terminal provided at the charging device 200 and may be exposed to the outside to come into contact with the charging terminal of the charging device 200. The first charging terminal 173 may apply a voltage applied to the charging terminal of the charging device 200 to the battery 171.

The divider 174 may divide a charge voltage (a voltage to charge the battery) applied by the charging device 200 to the first charging terminal 173 to detect the charge voltage. The divider 174 may scale down the voltage applied to the first charging terminal 173 at a certain percentage.

For example, the charging device 200 may apply the voltage of about 24.9 volts (V) to the first charging terminal 173, and the divider 174 may divide the voltage across the first charging terminal 173 in the proportion of 1:4 and output ⅕ voltage of the voltage across the first charging terminal 173 to the robot controller 190. The robot controller 190 may use an analog-to-digital converter to detect the voltage output from the divider 174, and estimate the voltage applied to the first charging terminal 173.

The divider 174 may include a first resistor 174a and a second resistor 174b connected in series. The divider 174 may output a voltage at a node between the first and second resistors 174a and 174b, and the voltage output from the divider 174 may be determined based on a ratio between electric resistances of the first and second resistors 174a and 174b, and the voltage across the first charging terminal 173.

The robot controller 190 may identify whether the robot cleaner 100 docks with the charging device 200 based on the magnitude of the voltage output from the divider 174. In other words, the robot controller 190 may determine whether the charging terminal of the robot cleaner 100 makes contact with the charging terminal of the charging device 200 based on the magnitude of the voltage output from the divider 174. For example, when it is determined that a charge voltage of the charging device 200, e.g., 24.9V, is applied to the first charging terminal 173, the robot controller 190 may determine that the charging terminal of the robot cleaner 100 makes contact with the charging terminal of the charging device 200.

The switch 175 may allow or block connection between the first charging terminal 173 and the battery 171 in response to a control signal from the robot controller 190. The switch 175 may include a first switch 175a and a second switch 175b. The first and second switches 175a and 175b may be connected in series between the first charging terminal 173 and the battery 171, and may be closed (turned on) or opened (turned off) in response to a charge control signal from the robot controller 190.

The first switch 175a and the second switch 175b may include Metal Oxide Semiconductor Field Effect transistors (MOSFETs), or Bipolar Junction Transistors (BJTs). The first and second switches 175a and 175b may include mechanical switches, such as relays that operate according to an electrical signal.

The robot controller 190 may close (turn on) or open (turn off) the switch 175 based on the magnitude of the voltage output from the divider 174. For example, the robot controller 190 may close (turn on) the switch 175 to charge the battery 171 when the voltage output from the divider 174 that scales down the voltage applied to the first charging terminal 173 is equal to or higher than a reference voltage. Furthermore, the robot controller 190 may open (turn off) the switch 175 to prevent the battery 171 from being discharged when the voltage output from the divider 174 is lower than the reference voltage.

The first docking assistant 180 includes a signal receiver 181 and a first docking identifier 182.

The signal receiver 181 may wirelessly receive a guide signal transmitted from the charging device 200. The charging device 200 may wirelessly output the guide signal to guide the robot cleaner 100 to dock with the charging device 200.

The signal receiver 181 may include a plurality of receivers arranged along the outer surface of the robot cleaner 100, and each of the plurality of receivers may send a signal wirelessly received from the charging device 200 or an electrical signal corresponding to the received signal to the robot controller 190.

The robot controller 190 may determine an approximate location of the charging device 200 based on the guide signal received by the signal receiver 181. For example, the robot controller 190 may determine a direction in which the charging device 200 is located based on a location where the receiver that has received the guide signal from the charging device 200 is installed. Furthermore, the robot controller 190 may control the drive 140 for the robot cleaner 100 to move to the charging device 200 based on the direction in which the charging device 200 is located.

The charging device 200 may output rays, radio waves or ultrasound to guide the robot cleaner 100. The signal receiver 181 may receive the rays, radio waves or ultrasound output from the charging device 200. Each of the plurality of receivers may include an antenna, a photo diode, an ultrasonic microphone, or the like, depending on whether the charging device 200 outputs rays, radio waves or ultrasound.

The first docking identifier 182 may be provided to identify whether the robot cleaner 100 docks with the charging device 200. The first docking identifier 182 may identify a second docking member arranged in the charging device 200, or the second docking member may identify the first docking identifier 182.

The first docking identifier 182 may send a docking identification signal representing whether the second docking member arranged in the charging device 200 is identified to the robot controller 190. The robot controller 190 may identify whether the robot cleaner 100 docks with the charging device 200 based on the docking identification signal output from the first docking identifier 182. Furthermore, the robot controller 190 may close (turn on) the switch 175 to charge the battery 171 based on the voltage applied to the first charging terminal 173.

The first docking identifier 182 will be described in more detail later.

The robot controller 190 may control the components included in the robot cleaner 100, and may include an image processor 191, a main processor 192, and a memory 193.

The image processor 191 may receive image data acquired by the imager 130 and process the image data. The image processor 191 may obtain a distance to an obstacle and an angle of direction of the obstacle by processing data corresponding to the forward image among the image data. The image processor 191 may also obtain a moving speed and a moving direction of the robot cleaner 100 by processing data corresponding to the upward image among the image data.

The image processor 191 may output information about an obstacle in front of the robot cleaner 100 and information about motion of the robot cleaner 100 by processing image data from the image module 130.

The main processor 192 may receive an output from the detector 120 and an output from the image processor 191 to generate a movement control signal to control the drive 140 and a cleaning control signal to control the cleaner 150.

The main processor 192 may create a driving record of the robot cleaner 100 based on the moving speed and moving direction output from the sensors of the detector 120 and the moving speed and moving direction output from the image processor 191, and store the driving record in the storage 160. The main processor 192 may create map data representing features of the space being cleaned based on the driving record stored in the storage 160.

The main processor 192 may create a moving path to clean the floor of the space based on the map data, create and output a movement control signal to the drive 140 to drive the robot cleaner 100 along the moving path.

The main processor 192 may receive the distance to an obstacle and the angle of direction of the obstacle from the image processor 191, create a movement control signal to avoid the obstacle based on the distance to the obstacle and the angle of direction of the obstacle, and output the movement control signal to the drive 140.

The main processor may determine a direction in which the charging device 200 is located based on a signal output from the signal receiver 181, and send a movement control signal to the drive 140 to drive the robot cleaner 100 to the charging device 200.

The main processor 192 may receive a docking identification signal output from the first docking identifier 182, and identify whether the robot cleaner 100 docks with the charging device 200 based on the docking identification signal.

The main processor 192 may measure a voltage output from the divider 174 when the robot cleaner 100 is located at a designated position to dock with the charging device 200. The main processor 192 may determine whether the charging terminal of the robot cleaner 100 makes contact with the charging terminal of the charging device 200 based on the voltage output from the divider 174. The main processor 192 may close (turn on) or open (turn off) the switch 175 based on whether the charging terminal of the robot cleaner 100 makes contact with the charging terminal of the charging device 200. In other words, the main processor 192 may close (turn on) or open (turn off) the switch 175 based on the voltage output from the divider 174.

The memory 193 may load a program and data from the storage 160 to control operation of the robot cleaner 100, and provide the program and data to the image processor 191 and the main processor 192.

The memory 193 may temporarily store a use input received through the user interface 110, a detection signal output from the detector 120, image data output from the imager 130, information about an obstacle and motion output from the image processor 191, and various control signals output from the main processor 192.

The memory 193 may include volatile memories, such as Static Random Access Memories (S-RAMs), Dynamic RAMs (D-RAMs), or the like, and non-volatile memories, such as Read Only Memories (ROMs), Erasable Programmable ROMs (EPROMs), or the like.

Configuration and operation of the charging device 200 will now be described.

Figure 7:
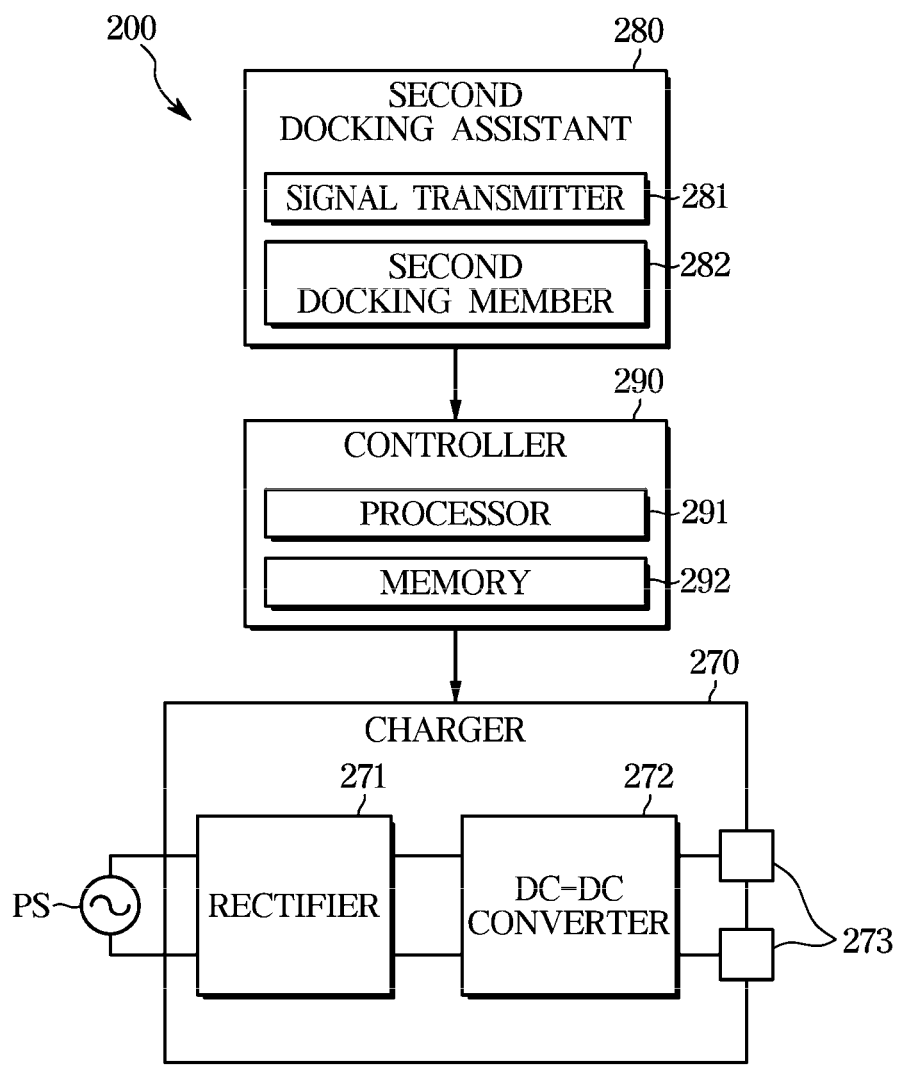
FIG. 7 is a block diagram of a charging device, according to an embodiment of the disclosure.
Figure 8:
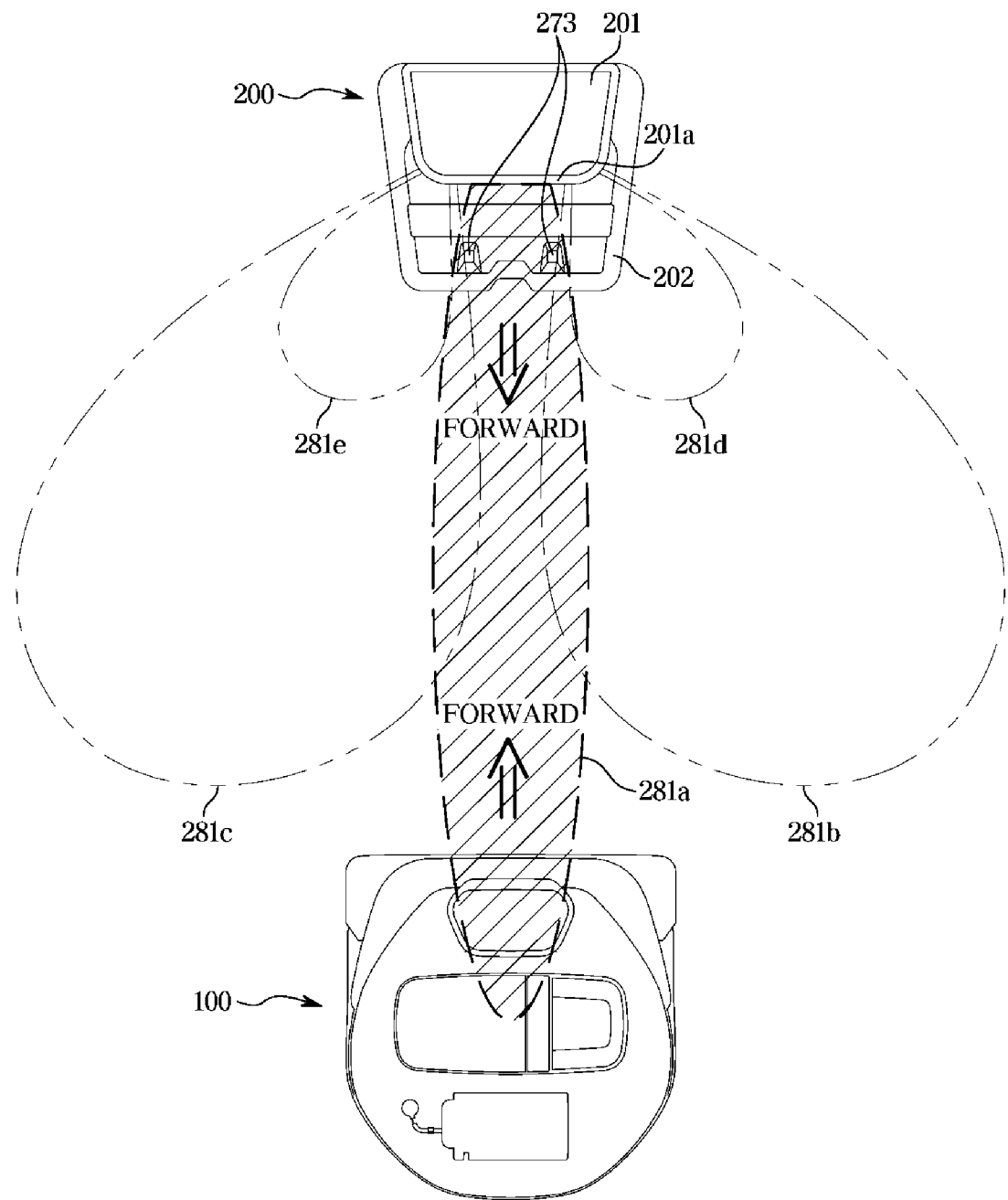
FIG. 8 shows a plurality of guide signals transmitted from a charging device, according to an embodiment of the disclosure.

FIG. 7 is a block diagram of a charging device, according to an embodiment of the disclosure. FIG. 8 shows a plurality of guide signals transmitted from a charging device, according to an embodiment of the disclosure.

Referring to FIGS. 7 and 8, the charging device 200 may include a base 202, and a main body 201 protruding from the base 202. The base 202 includes a plane substantially parallel to or a bit slanted from the floor. A second charging terminal 273 is arranged on the plane of the base 202, which makes contact with the first charging terminal 173 of the robot cleaner 100.

The charging device 200 may include components arranged inside and outside of the main body 201 to implement (charging) capabilities of the charging device 200.

The charging device 200 may include a charger 270, a second docking assistant 280, and a charging controller 290.

The charger 270 may convert ac power from an external power source (PS) to dc power to charge the battery 171 of the robot cleaner 100, and supply the dc power to the robot cleaner 100.

The charger 270 may include a rectifier 271, a dc-dc converter 272, and a second charging terminal 273.

The rectifier 271 may receive the ac power from the external PS, convert the ac power to dc power, and output the dc power. For example, the rectifier 271 may include bridge diodes to convert the direction of an ac voltage and ac current to a positive voltage and positive current, and a capacitor to eliminate ripples of the positive voltage.

The dc-dc converter 272 may adjust the voltage of the dc power rectified by the rectifier 271. For example, the dc-dc converter 272 may convert the voltage of the dc power rectified by the rectifier 271 to about 24.9V.

Although the charging device 200 is described to include the rectifier 271 and the dc-dc converter 272, it is not limited thereto. For example, the charging device 200 may include a transformer (or an ac-ac converter) and a rectifier.

The second charging terminal 273 may contact the first charging terminal 173 of the robot cleaner 100, and may be exposed to the outside to come into contact with the first charging terminal 173 of the robot cleaner 100. The second charging terminal 273 may apply the dc voltage output from the dc-dc converter 272 to the first charging terminal 173 of the robot cleaner 100.

When the second charging terminal 273 makes contact with the first charging terminal 173, the voltage output from the charger 270 of the charging device 200 is applied to the battery 171 of the robot cleaner 100, and the current output from the charger 270 of the charging device 200 may be applied to the battery 171 of the robot cleaner 100.

The second docking assistant 280 includes a signal transmitter 281 and a second docking identifier 282.

The signal transmitter 281 may wirelessly output a guide signal to guide the robot cleaner 100 to dock with the charging device 200.

The signal transmitter 281 may output a plurality of guide signals to guide the robot cleaner 100. For example, the signal transmitter 281 may transmit the plurality of guide signals from the main body 201 of the charging device 200 in different directions.

As shown in FIG. 8, the guide signals may include a center guide signal 281a transmitted from a front face 201a of the main body 201 to the second charging terminal 273. The guide signals may further include a first left guide signal 281b transmitted long distance from the main body 201 to the left of the second charging terminal 273, and a first right guide signal 281c transmitted long distance from the main body 201 to the right of the second charging terminal 273. Furthermore, the guide signals may include a second left guide signal 281d transmitted short distance from the main body 201 to the left of the second charging terminal 273, and a second right guide signal 281e transmitted short distance from the main body 201 to the right of the second charging terminal 273.

The robot cleaner 100 may identify an approximate direction in which the charging device 200 is located based on the received guide signal, and control the drive 140 to have the robot cleaner 100 guided by the guide signal. For example, the robot cleaner 100 may move to a direction in which the receive strength of the center guide signal 281a increases, upon reception of the center guide signal 281a.

The signal transmitter 281 may output rays, radio waves or ultrasound to guide the robot cleaner 100. The signal transmitter 281 may include an antenna, an LED, an ultrasonic speaker, or the like.

The second docking identifier 282 may be provided to identify whether the robot cleaner 100 docks with the charging device 200. The second docking identifier 282 may identify the first docking identifier 182 arranged in the robot cleaner 100, or the first docking identifier 182 may identify the second docking identifier 282.

The second docking identifier 282 may send a docking identification signal representing whether the first docking identifier 182 is identified to the charging controller 290. The charging controller 290 may control the charger 270 to output power to charge the robot cleaner 100 based on the docking identification signal output from the second docking identifier 282. For example, the charging controller 290 may control the dc-dc converter 272 to output a charge voltage of about 24.9V based on the docking identification signal output from the second docking identifier 282.

The second docking identifier 282 will be described in more detail later.

The charging controller 290 may control the components included in the charging device 200, and may include a processor 291 and a memory 292.

The processor 291 may receive a docking identification signal output from the second docking identifier 282, and identify whether the robot cleaner 100 docks with the charging device 200 based on the docking identification signal.

The processor 291 may send a charging control signal to the charger 270 to output a voltage to charge the battery 171 of the robot cleaner 100 when it is determined that the robot cleaner 100 docks with the charging device 200. For example, the processor 291 may send a charging control signal to the dc-dc converter 272 to output the voltage of 24.9 V.

The memory 292 may store a program and data for controlling the operation of the charging device 200. Furthermore, the memory 291 may temporarily store the docking identification signal output from the second docking identifier 282, and various control signals output from the processor 291.

The memory 292 may include volatile memories such as S-RAMs, D-RAMs, etc., and non-volatile memories such as flash memories, ROMs, EPROMs, etc.

Various methods for the charging device 200 to charge the robot cleaner 100 will now be described.

Figure 9:
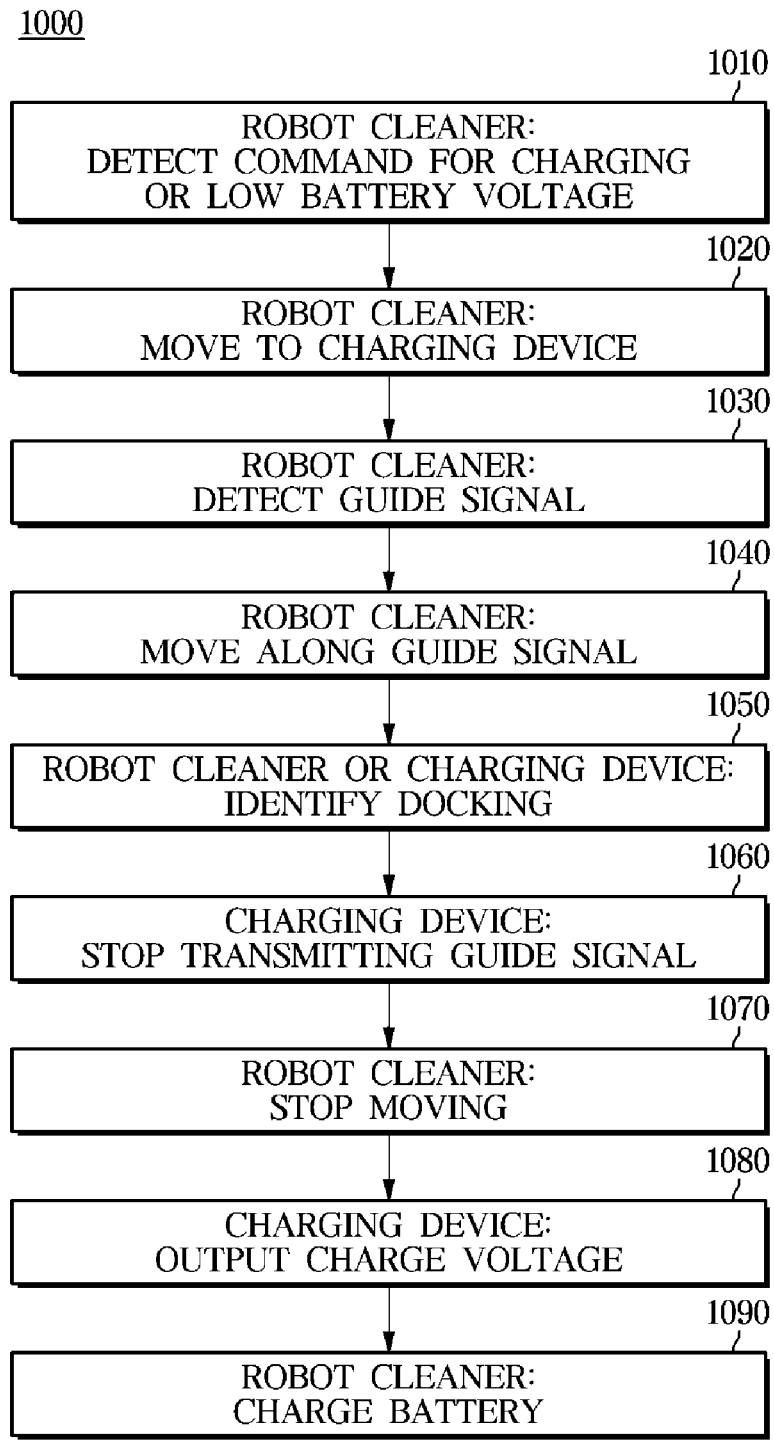
FIG. 9 shows an example of docking and charging operations of a robot cleaner and charging device, according to an embodiment of the disclosure.

FIG. 9 shows an example of docking and charging operations of a robot cleaner and charging device, according to an embodiment of the disclosure.

An example of docking and charging operation 1000 of the robot cleaner 100 and the charging device 200 will be described in connection with FIG. 9.

The robot cleaner 100 receives a return command from the user or detects a low voltage of the battery 171, in operation 1010.

The robot cleaner 100 may include a return button to return the robot cleaner 100 to the charging device 200 for charging. Specifically, the robot controller 190 may receive a return command input from the user through the user interface 110.

Furthermore, the robot cleaner 100 may monitor an output voltage of the battery 171, and identify whether the output voltage of the battery 171 is lower than a required charge voltage. The required charge voltage may be higher than a minimum voltage at which operation of the robot cleaner 100 is suspended. The robot controller 190 may turn on the switch 175, and measure the output voltage of the battery 171 based on the voltage output from the divider 174 while the switch 175 is turned on. The robot controller 190 may identify whether the output voltage of the battery 171 is lower than the required charge voltage.

The robot cleaner 100 moves to the charging device in operation 1020.

The robot cleaner 100 may usually start moving from the charging device 200, and the robot controller 190 may store the driving record that the robot cleaner 100 has moved. Furthermore, the robot controller 190 may create a map of the space being cleaned based on the driving record, and store the map in the storage 160.

The robot controller 190 may determine a location of the charging device 200 based on the map stored in the storage 160. For example, as the robot cleaner 100 starts moving from the charging device 200, the charging device 200 may be said to be located at an original point of the map.

The robot controller 190 may control the drive 140 for the robot cleaner to move to the location of the charging device 200.

The robot cleaner 100 detects a guide signal from the charging device 200, in 1030.

When the robot cleaner 100 comes close to the charging device 200, the robot controller 190 may receive the guide signal from the charging device 200 through the signal receiver 181.

For example, the charging device 200 may transmit a plurality of guide signals including the center guide signal 281a to guide the robot cleaner 100. The robot controller 190 may receive the center guide signal 281a through the plurality of receivers arranged along the outer surface of the robot cleaner 100.

The robot cleaner 100 moves according to the guide signal from the charging device 200, in operation 1040.

The robot controller 190 may receive the guide signal of the charging device 200 through the plurality of receivers arranged along the outer surface of the robot cleaner 100. Especially, the robot controller 190 may receive the center guide signal 281a of the charging device 200.

The robot controller 190 may determine a direction in which the charging device 200 is located based on a location where the receiver that has received the guide signal from the charging device 200 is installed. The robot controller 190 may control the drive 140 for the robot cleaner 100 to move to the charging device 200 based on the direction in which the charging device 200 is located. For example, the robot controller 190 may control the drive 140 for the robot cleaner 100 to move to a direction in which the receive strength of the center guide signal 281a increases, upon reception of the center guide signal 281a.

The robot cleaner 100 or the charging device 200 identifies docking of the robot cleaner 100.

At least one of the robot cleaner 100 and the charging device 200 may identify the robot cleaner 100 docking with the charging device 200.

For example, the first docking identifier 182 of the robot cleaner 100 may identify the second docking identifier 282 arranged in the charging device 200, and send a docking identification signal representing whether the second docking identifier 282 is identified to the robot controller 190. The robot controller 190 may identify whether the robot cleaner 100 docks with the charging device 200 based on the docking identification signal output from the first docking identifier 182.

Furthermore, the second docking identifier 282 of the charging device 200 may identify the first docking identifier 182 arranged in the robot cleaner 100, and send a docking identification signal representing whether the first docking identifier 182 is identified to the charging controller 290. The charging controller 290 may identify whether the robot cleaner 100 docks with the charging device 200 based on the docking identification signal output from the second docking identifier 282.

In response to the docking of the robot cleaner 100, the charging device 200 stops transmitting the guide signal, in operation 1060.

The charging controller 290 may identify docking of the robot cleaner 100 by using the second identifier 282. The charging controller 290 may control the signal transmitter 281 to stop transmitting the guide signal based on the identification of docking of the robot cleaner 100.

When the charging device 200 identifies the docking of the robot cleaner 100 earlier than the robot cleaner 100 does, the charging controller 290 may inform the robot cleaner 100 that the robot cleaner 100 docks with the charging device 200 by stopping transmitting the guide signal.

In response to the docking of the robot cleaner 100, the robot cleaner 100 stops moving, in operation 1070.

The robot controller 190 may identify docking of the robot cleaner 100 by using the first docking identifier 182. The robot controller 190 may control the drive 140 to stop moving the robot cleaner 100 in response to the identification of docking of the robot cleaner 100.

The charging device 200 outputs a charge voltage, in operation 1080.

The charging controller 290 may control the charger 270 to output power through the second charging terminal 273 when the docking of the robot cleaner 100 is identified. For example, the charging controller 290 may control the dc-dc converter 272 to apply the voltage of 24.9V to the second charging terminal 273.

The robot cleaner 100 charges the battery 171, in operation 1090.

The robot controller 190 may measure the charge voltage applied to the first charging terminal 173 by using the divider 174. The robot controller 190 may close (turn on) the switch 175 to charge the battery 171 when the voltage output from the divider 174 that scales down the voltage applied to the first charging terminal 173 is equal to or higher than the reference voltage.

As described above, the charging device 200 may use the second docking identifier 282 arranged separately from the second charging terminal 273 to identify docking of the robot cleaner 100 with the charging device 200, and accordingly, prevent the charge voltage from being applied to the second charging terminal 273 while the second charging terminal 273 is exposed to the outside. Furthermore, the robot cleaner 100 may use the first docking identifier 182 arranged separately from the first charging terminal 173 to identify docking of the robot cleaner 100 with the charging device 200, and accordingly, prevent the voltage of the battery 171 being applied to the first charging terminal 173 while the first charging terminal 173 is exposed to the outside.

Figure 10:
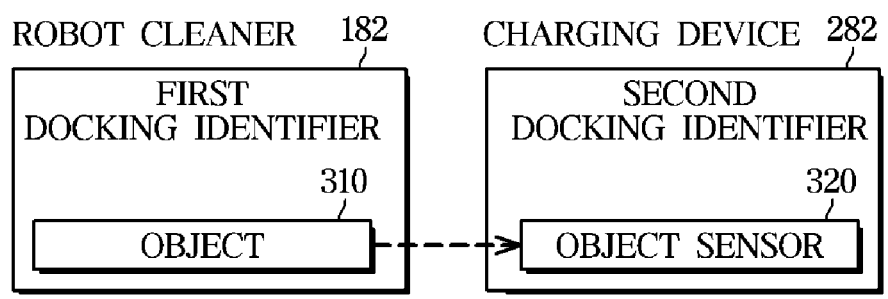
FIG. 10 shows a first docking identifier of a robot cleaner and a second docking identifier of a charging device, according to an embodiment of the disclosure.
Figure 11:
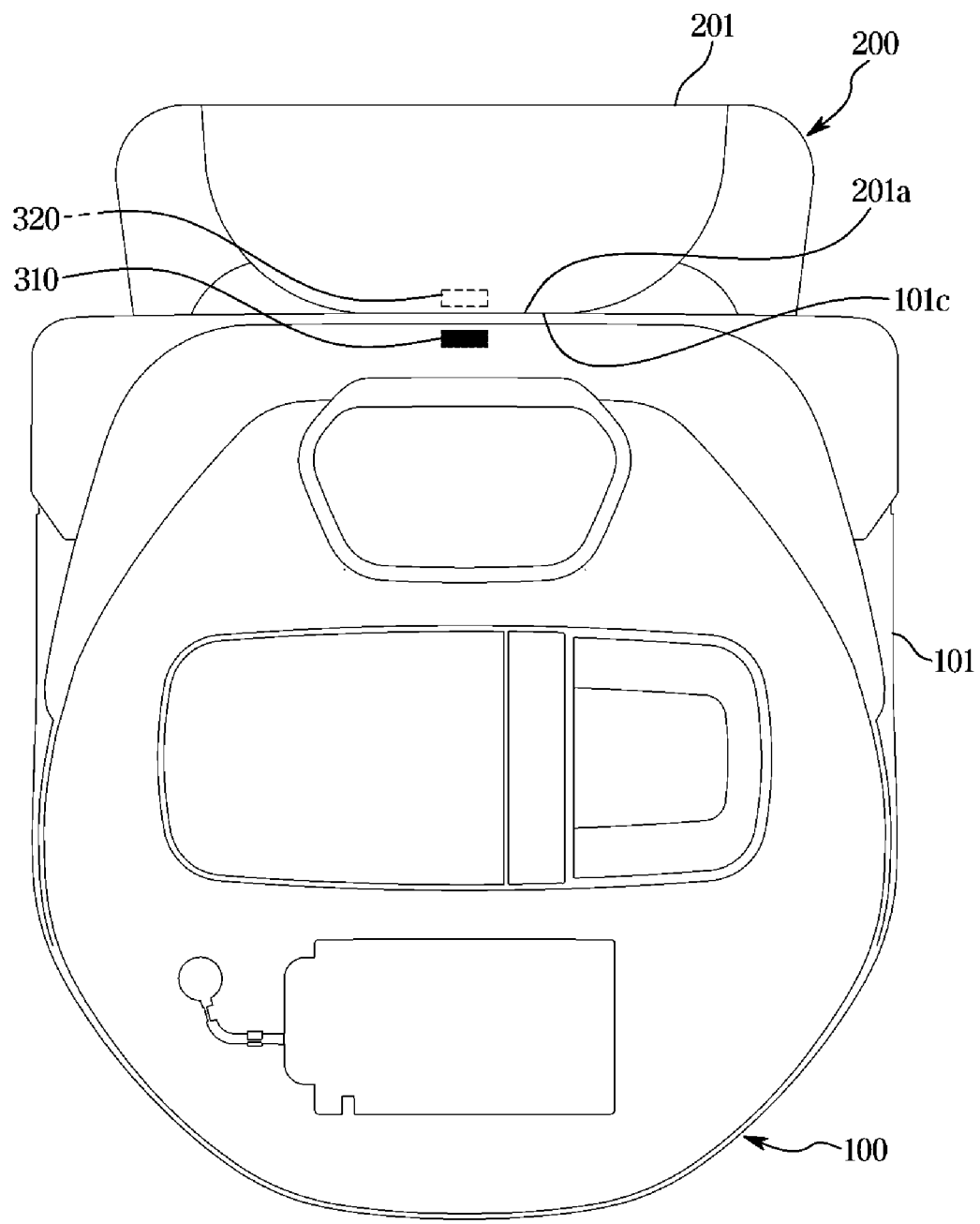
FIG. 11 shows where an object of the robot cleaner shown in FIG. 10 and an object sensor of the charging device are installed according to an embodiment of the disclosure.

FIG. 10 shows a first docking identifier of a robot cleaner and a second docking identifier of a charging device, according to an embodiment of the disclosure. FIG. 11 shows where an object of the robot cleaner shown in FIG. 10 and an object sensor of the charging device are installed according to an embodiment of the disclosure.

Referring to FIGS. 10 and 11, the robot cleaner 100 includes the first docking identifier 182. The charging device 200 includes the second docking identifier 282.

The first docking identifier 182 may be provided to identify whether the robot cleaner 100 is located at a designated position to dock with the charging device 200 through interaction with the second docking identifier 282. The second docking identifier 282 may also be provided to identify whether the robot cleaner 100 is located at a designated position to dock with the charging device 200 through interaction with the first docking identifier 182.

The first docking identifier 182 may include an object 310 installed at the main body 101 of the robot cleaner 100, and the second docking identifier 282 may include an object sensor 320 installed at the main body 201 or the base 202 of the charging device 200. When the robot cleaner 100 approaches the charging device 200, the object comes close to the object sensor 320 of the charging device 200, and the object sensor 320 may detect the object 310 of the robot cleaner 100.

The object 310 may be formed of various materials in various shapes. For example, the object 310 may include a permanent magnet that produces a magnetic field, a blocking projection that blocks light, a reflective projection that reflects light, an electrically conductive projection, etc.

The object sensor 320 may include various types of sensors for detecting the object 310 depending on the shape and material of the object 310.

For example, the object 310 may include a permanent magnet to produce a magnetic field, and the object sensor 320 may include a hall sensor to detect the magnetic field around the permanent magnet. When the robot cleaner 100 is located at the designated position to dock with the charging device 200, the object sensor 320, a hall sensor, may detect a magnetic field around the permanent magnet that is the object 310.

In another example, the object 310 may include a blocking projection to block light, and the object sensor 320 may include an LED to emit light and a photo diode arranged opposite the LED to receive the light emitted from the LED. When the robot cleaner 100 is not located in the designated position to dock with the charging device 200, the photo diode of the object sensor 320 may receive the light emitted from the LED. When the robot cleaner 100 is located at the designated position to dock with the charging device 200, the light emitted from the LED of the object sensor 320 is blocked by the blocking projection of the object 310 and the photo diode receives no light.

In another example, the object 310 may include a reflective projection to reflect light, and the object sensor 320 may include an LED to emit light and a photo diode arranged close to the LED to receive the light emitted from the LED. When the robot cleaner 100 is not located in the designated position to dock with the charging device 200, the photo diode of the object sensor 320 may not receive the light emitted from the LED. When the robot cleaner 100 is located at the designated position to dock with the charging device 200, the light emitted from the LED of the object sensor 320 is reflected by the object 310, a reflective projection, and the photo diode may receive the light reflected by the reflective projection.

In another example, the object 310 may include an electrically conductive projection, and the object sensor 320 may include a capacitive sensor to detect a change in capacitance. When the robot cleaner 100 is located at the designated position to dock with the charging device 200, the object sensor 310, the electrically conductive projection, approaches the capacitive sensor, and the capacitive sensor may detect a change in capacitance from the electrically conductive projection.

As described above, when the robot cleaner 100 is located at the designated position to dock with the charging device 200, the object sensor 320 may detect the object 310 without contact.

Docking the robot cleaner 100 with the charging device 200 means that the first charging terminal 173 of the robot cleaner 100 makes contact with the second charging terminal 273 of the charging device 200. To identify whether the robot cleaner 100 is located at the designated position to dock with the charging device 200, the object 310 may be arranged at a location corresponding to the object sensor 320.

For example, the object 310 may be arranged on the front face 101c of the robot cleaner 100 while the object sensor 320 may be arranged on the front face 201a of the charging device 200, as shown in FIG. 11. Specifically, the object sensor 320 may be installed at a location that allows detection of the object 310 of the robot cleaner 100 when the robot cleaner 100 is located at the designated position to dock with the charging device 200.

For example, the object 310 may be arranged on the bottom center of the front face of the robot cleaner 100, and the object sensor 320 may be arranged on the bottom center of the front face of the charging device 200. When the first charging terminal 173 of the robot cleaner 100 makes contact with the second charging terminal 273 of the charging device 200 or the first charging terminal 173 is just located close the second charging terminal 273, the object sensor 320 arranged between the second charging terminals 273 may detect the object 310 arranged between the first charging terminals 173.

In another example, the object 310 may be arranged between a pair of electrodes included in the first charging terminal 173, and the object sensor 320 may be arranged between a pair of electrodes included in the second charging terminal 273. When the first charging terminal 173 of the robot cleaner 100 makes contact with the second charging terminal 273 of the charging device 200 or the first charging terminal 173 is just located close the second charging terminal 273, the object sensor 320 arranged between the second charging terminals 273 may detect the object 310 arranged between the first charging terminals 173.

As described above, as the object 310 and the object sensor 320 are arranged at locations allowing the object sensor 320 to detect the object 310 when the robot cleaner 100 docks with the charging device 200, the charging device 200 may identify that the robot cleaner 100 is located in the designated position to dock with the charging device 200 when the object sensor 320 detects the object 310.

Figure 12:
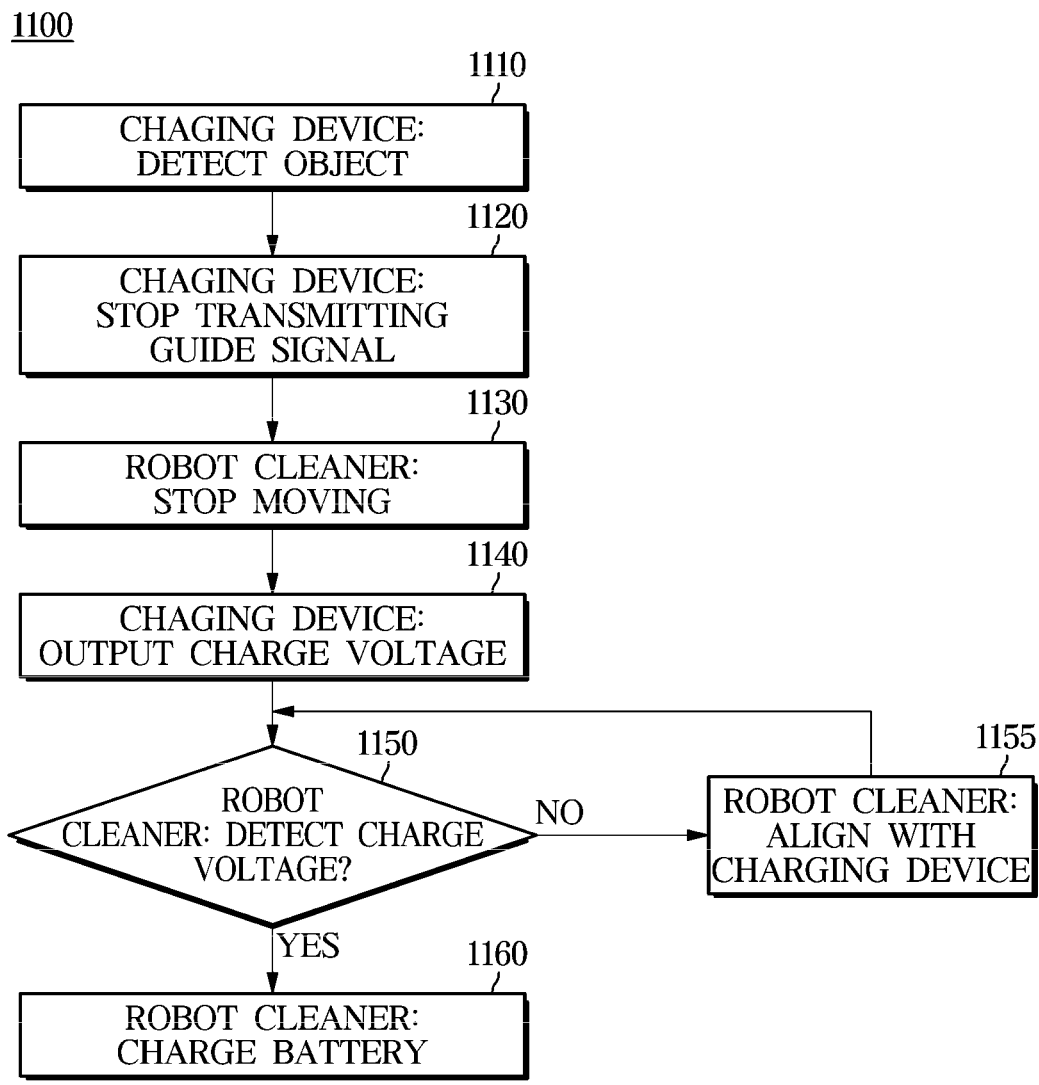
FIG. 12 shows docking and charging operations of the robot cleaner and charging device shown in FIG. 10 according to an embodiment of the disclosure.
Figure 13:
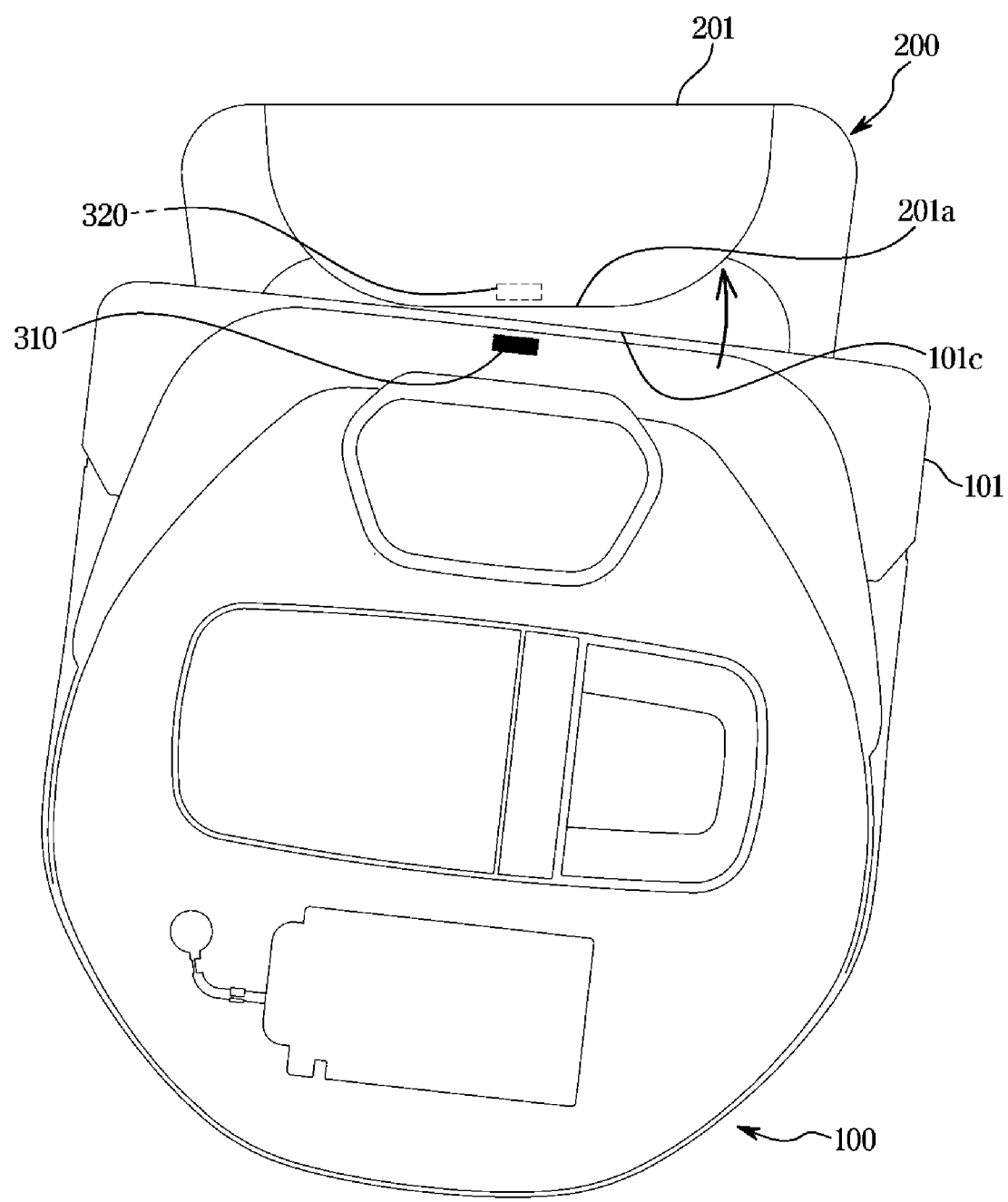
FIG. 13 shows alignment between the robot cleaner and the charging device shown in FIG. 10 according to an embodiment of the disclosure.

FIG. 12 shows an example of docking and charging operations of the robot cleaner and charging device shown in FIG. 10 according to an embodiment of the disclosure. FIG. 13 shows alignment between the robot cleaner and the charging device shown in FIG. 10 according to an embodiment of the disclosure.

Docking and charging operation 1100 of the robot cleaner 100 and the charging device 200 will be described in connection with FIGS. 12 and 13.

The object sensor 320 of the charging device 200 detects the object 310 of the robot cleaner 100, in 1110.

The charging device 200 may output a guide signal to guide the robot cleaner 100, and the robot cleaner 100 may come close to the charging device 200 according to the guide signal of the charging device 200.

When the robot cleaner 100 is located in the designated position to dock with the charging device 200, the object sensor 320 of the charging device 200 may detect the object 310 installed at the robot cleaner 100. For example, when the robot cleaner 100 is located in the designated position to dock with the charging device 200, a hall sensor of the charging device 200 may detect a magnetic field around a permanent magnet installed at the robot cleaner 100.

The object sensor 320 of the charging device 200 sends a docking identification signal to the charging controller 290 when detecting the object 310 of the robot cleaner 100.

In response to the object sensor 320 detecting the object 310, the charging device 200 stops transmitting the guide signal, in operation 1120.

The charging controller 290 may identify that the robot cleaner 100 is located at the designated position to dock with the charging device 200 based on the docking identification signal received from the object sensor 320. Furthermore, the charging controller 290 may control the signal transmitter 281 to stop transmitting the guide signal.

In response to the charging device 200 stopping transmission of the guide signal, the robot cleaner 100 stops moving, in operation 1130.

The robot controller 190 may identify that the robot cleaner 100 is located at the designated position to dock with the charging device 200 when the reception of the guide signal is suspended. The robot controller 190 may control the drive 140 to stop moving the robot cleaner 100 and stay at the designated position for docking.

After stopping transmission of the guide signal, the charging device 200 outputs a charge voltage, in operation 1140.

After the transmission of the guide signal is stopped, the charging controller 290 may control the charger 270 to output power through the second charging terminal 273. For example, the charging controller 290 may control the dc-dc converter 272 to apply the voltage of 24.9V to the second charging terminal 273.

After stopping moving, the robot cleaner 100 determines whether the charge voltage of the charging device 200 is detected, in operation 1150.

The robot controller 190 may measure the charge voltage applied to the first charging terminal 173 by using the divider 174. When the first charging terminal 173 of the robot cleaner 100 makes contact with the second charging terminal 273 of the charging device 200, the charge voltage output from the charging device through the second charging terminal 273 is applied across the first charging terminal 173. The robot controller 190 may measure the charge voltage applied to the first charging terminal 173 through the divider 174.

The object 310 of the robot cleaner 100 and the object sensor 320 of the charging device 200 may be separately provided by being separated from the first charging terminal 173 and the second charging terminal 273, respectively. Furthermore, even when the robot cleaner 100 deviates from the designated position for docking to some extent, the object sensor 320 of the charging device 200 may detect the object 310 of the robot cleaner 100. Accordingly, there is an error between the object sensor 320 detecting the object 310 and the first charging terminal 173 contacting the second charging terminal 273. This is why the charge voltage of the charging device 200 is determined to allow the robot controller 190 to accurately identify whether the first charging terminal 173 contacts the second charging terminal 273.

Specifically, the robot controller 190 may determine whether the voltage output from the divider 174 that scales down a voltage applied to the first charging terminal 173 is equal to or higher than the reference voltage. For example, when the charging device 200 applies the charge voltage of 24.9V to the second charging terminal 273 and the divider 174 reduces the voltage at the first charging terminal 173 to a fifth of the voltage, the robot controller 190 may determine whether the output voltage from the divider 174 is equal to or higher than 4V.

When the charge voltage of the charging device 200 is not detected in operation 1150, the robot cleaner 100 aligns with the charging device 200, in operation 1155.

When the robot cleaner 100 is located at a position different from but near the designated position for docking, the robot controller 190 may control the drive 140 for the robot cleaner 100 to move to the designated position for docking.

For example, the robot controller 190 may control the movement of the robot cleaner 100 based on the output of the detector 120.

As shown in FIG. 13, the left part of the robot cleaner 100 may come closer to the charging device 200 than the right part does, in which case the first collision sensor 123 arranged on the left side of the bumper 102 may send a collision detection signal to the robot controller 190 while the second collision sensor 124 arranged on the right side of the bumper 102 may send non-collision detection signal to the robot controller 190.

The robot controller 190 may control the drive 140 for the robot cleaner 100 to turn left in response to the output signals from the first and second collision sensors 123 and 124. This enables the robot cleaner 100 to move such that the front face 101c of the robot cleaner 100 is aligned with the front face 201a of the charging device 200.

Furthermore, while the robot cleaner 100 turns at the same place, the robot controller 190 may determine whether the charge voltage of the charging device 200 is detected.

In another example, the robot controller 190 may control the drive 140 for the robot cleaner 100 to turn clockwise or counterclockwise at the same place. Furthermore, while the robot cleaner 100 turns at the same place, the robot controller 190 may determine whether the charge voltage of the charging device 200 is detected.

In another example, the robot controller 190 may control the drive 140 for the robot cleaner to move to the charging device 200. As the robot cleaner 100 moves further to the charging device 200, the front face 101c of the robot cleaner 100 may be aligned with the front face 201a of the charging device 200. Furthermore, while the robot cleaner 100 turns at the same place, the robot controller 190 may determine whether the charge voltage of the charging device 200 is detected.

When the charge voltage of the charging device 200 is detected in 1150, the robot cleaner 100 charges the battery 171, in operation 1160.

The robot controller 190 may close (turn on) the switch 175 to charge the battery 171 when the voltage output from the divider 174 that scales down the voltage applied to the first charging terminal 173 is equal to or higher than the reference voltage.

As the switch 175 is turned on, the charge voltage applied to the first charging terminal 173 from the charging device 200 is applied to the battery 171 and the current to charge the battery 171 may be applied to the battery 171 from the charging device 200. In other words, turning on the switch 175 may lead to charging the battery 171.

As described above, the charging device 200 may use the object sensor 320 to identify whether the robot cleaner 100 is located at the designated position for docking. This may prevent the charge voltage from being applied to the second charging terminal 273 while the second charging terminal 273 is exposed to the outside to identify whether the robot cleaner 100 docks with the charging device 200. It may further prevent safety accidents that might occur when a voltage is applied to an exposed charging terminal.

Figure 14:
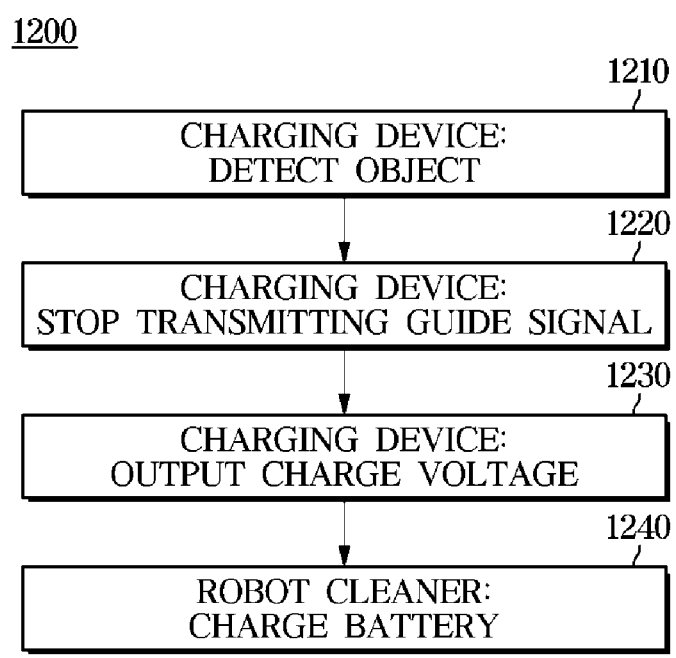
FIG. 14 shows another example of docking and charging operations of the robot cleaner and charging device shown in FIG. 10 according to an embodiment of the disclosure.
Figure 15:
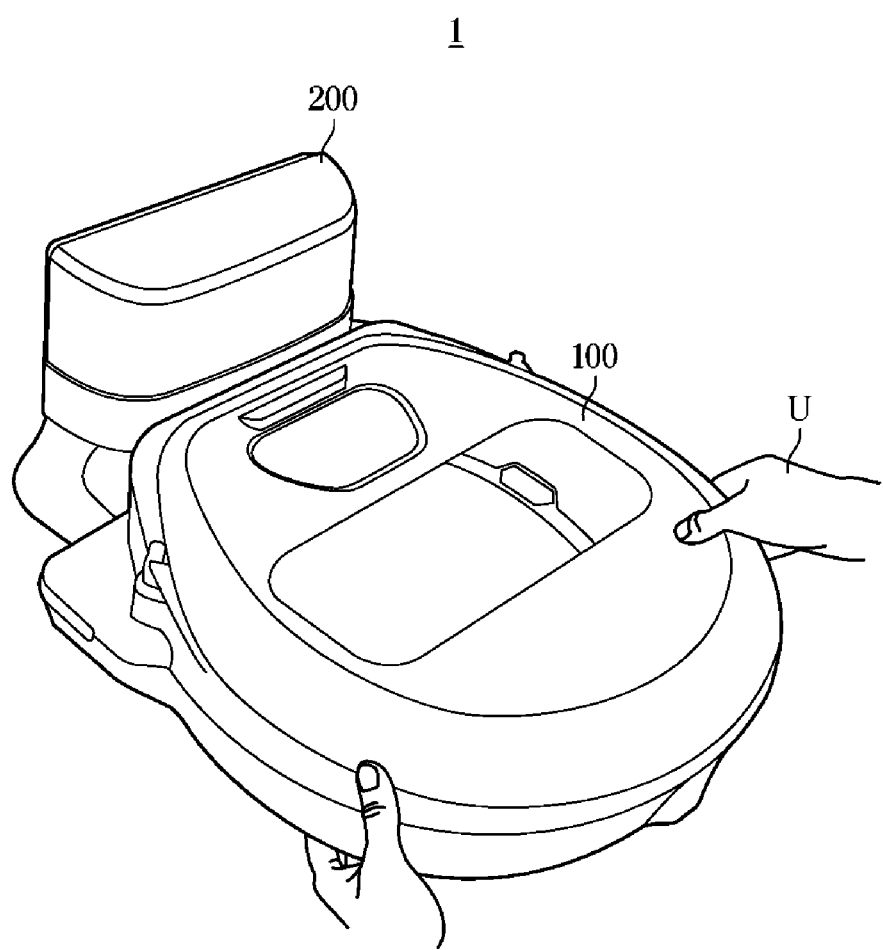
FIG. 15 shows an example of how the user docks the robot cleaner shown in FIG. 10 with the charging device according to an embodiment of the disclosure.

FIG. 14 shows another example of docking and charging operations of the robot cleaner and charging device shown in FIG. 10 according to an embodiment of the disclosure. FIG. 15 shows an example of how the user docks the robot cleaner shown in FIG. 10 with the charging device according to an embodiment of the disclosure.

Docking and charging operation 1200 of the robot cleaner 100 and the charging device 200 when the output voltage of the battery 171 is lower than a minimum voltage will be described in connection with FIGS. 14 and 15.

The object sensor 320 of the charging device 200 detects the object 310 of the robot cleaner 100, in operation 1210.

When the output voltage of the battery 171 is lower than the minimum voltage (in so called a completely discharged state), operation of the robot cleaner 100 is suspended. Accordingly, the robot cleaner 100 may not autonomously move to the charging device 200, and as shown in FIG. 15, a user U himself or herself may put the robot cleaner 100 into the designated position to dock with the charging device 200.

When the user U puts the robot cleaner 100 into the designated position to dock with the charging device 200, the object sensor 320 of the charging device 200 may detect the object 310 installed at the robot cleaner 100. For example, in response to the user U putting the robot cleaner 100 into the designated position to dock with the charging device 200, a hall sensor of the charging device 200 may detect a magnetic field around a permanent magnet installed at the robot cleaner 100.

The object sensor 320 may send a docking identification signal to the charging controller 290 when detecting the object 310.

In response to the object sensor 320 detecting the object 310, the charging device 200 stops transmitting the guide signal in operation 1220, and outputs the charge voltage in operation 1230.

Operations 1220 and 1230 may be the same as the operations 1120 and 1140 shown in FIG. 12, respectively.

The robot cleaner 100 charges the battery 171, in operation 1240.

The charge voltage at the first charging terminal 173 may be applied directly to the robot controller 190. In other words, the power supplied from the charging device 200 to the robot cleaner 100 may be supplied first to the robot controller 190.

The robot controller 190 may initiate its operation with the power supplied from the charging device 200. Furthermore, the robot controller 190 may turn on the switch 175 to charge the battery 171. Turning on the switch 175 may lead to charging the battery 171.

As described above, even when the user U puts the robot cleaner 100 into the designated position to dock with the charging device 200, the charging device 200 may use the object sensor 320 arranged separately from the second charging terminal 273 to identify the robot cleaner 100 being located at the designated position to dock with the charging device 200.

Figure 16:
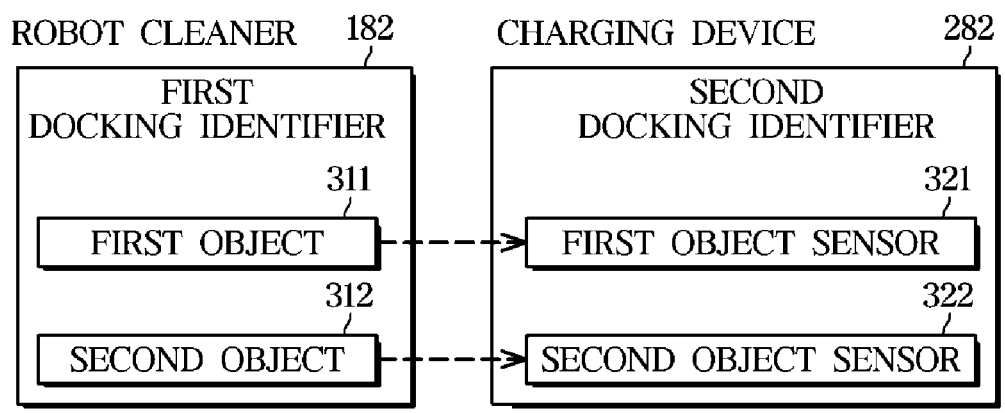
FIG. 16 shows a first docking identifier of a robot cleaner and a second docking identifier of a charging device, according to an embodiment of the disclosure.
Figure 17:
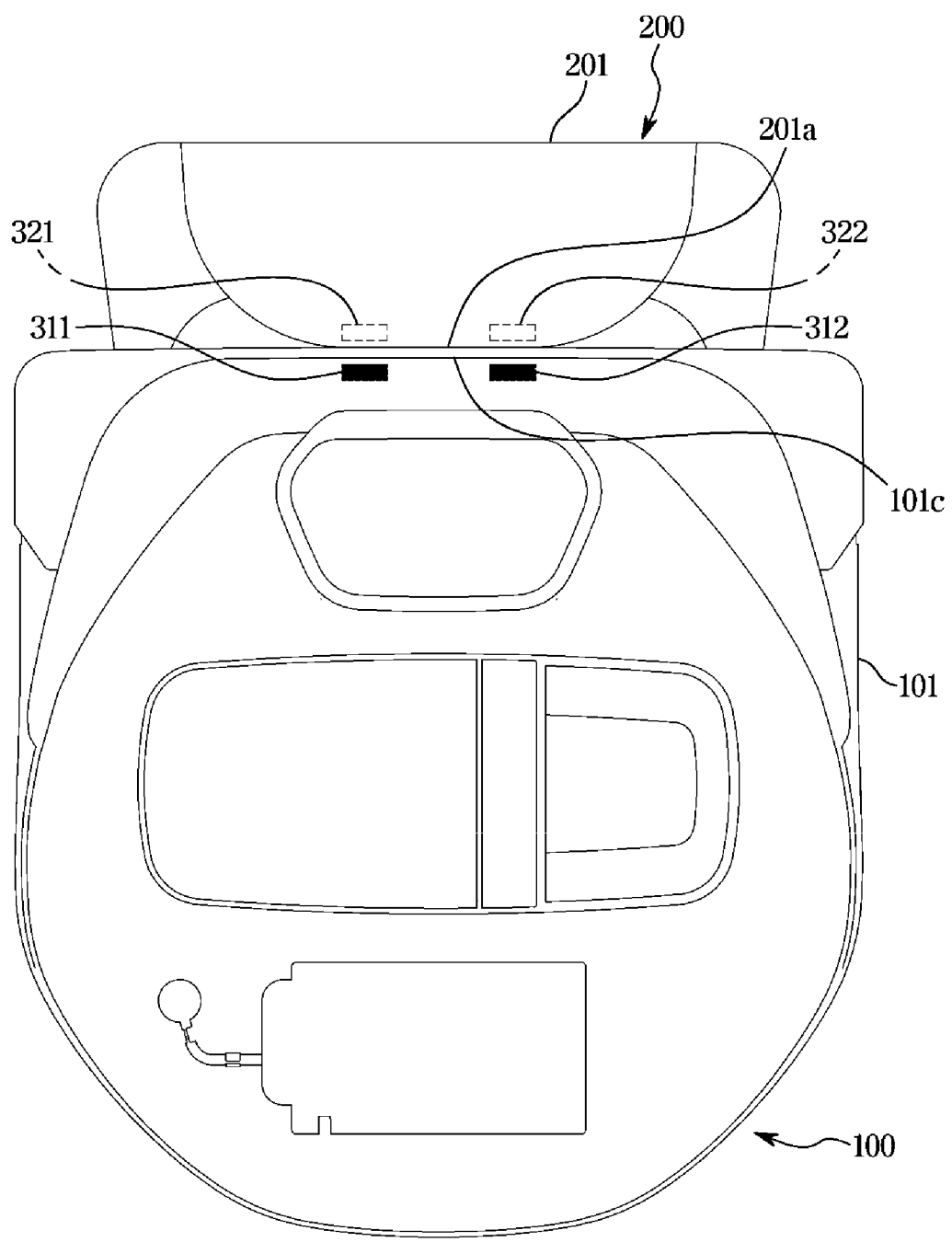
FIG. 17 shows where objects of the robot cleaner shown in FIG. 16 and object sensors of the charging device are installed according to an embodiment of the disclosure.

FIG. 16 shows a first docking identifier of a robot cleaner and a second docking identifier of a charging device, according to an embodiment of the disclosure. FIG. 17 shows where objects of the robot cleaner shown in FIG. 16 and object sensors of the charging device are installed according to an embodiment of the disclosure.

Referring to FIGS. 16 and 17, the robot cleaner 100 includes the first docking identifier 182. The charging device 200 includes the second docking identifier 282.

The first docking identifier 182 includes first and second objects 311 and 312 installed at the main body 101 of the robot cleaner 100, and the second docking identifier 282 includes first and second object sensors 321 and 322 installed at the main body 201 or the base 202 of the charging device 200.

The first and second objects 311 and 312 may include permanent magnets each producing a magnetic field, blocking projections that block light, reflective projections that reflect light, electrically conductive projections, etc. The first and second object sensors 321 and 322 may also include hall sensors, optical sensor modules (LEDs and photo diodes), or capacitive sensors to detect the object 310 depending on the shape and material of the first and second objects 311 and 312.

Each of the first and second objects 311 and 312 and each of the first and second object sensors 321 and 322 may be the same as the object 310 and the object sensor 320 shown in FIG. 10, respectively.

To identify whether the robot cleaner 100 is located at the designated position to dock with the charging device 200, the first and second objects 311 and 312 may be arranged at locations corresponding to the first and second object sensors 322.

For example, the first and second objects 311 and 312 may be arranged separately on the front face 101*c* of the robot cleaner 100 while the first and second object sensors 321 and 322 may be arranged separately on the front face 201*a* of the charging device 200, as shown in FIG. 11. A distance between the first and second objects 311 and 312 may be the same as a distance between the first and second object sensors 321 and 322.

Specifically, the first and second objects 311 and 312 may be arranged on the bottom left and bottom right of the front face of the robot cleaner 100, respectively, while the first and second object sensors 321 and 322 may be arranged on the bottom left and bottom right of the front face of the charging device 200, respectively.

In another example, the first and second objects 311 and 312 may be arranged around a pair of electrodes included in the first charging terminal 173, respectively, and the first and second object sensors 321 and 322 may be arranged around a pair of electrodes included in the second charging terminal 273, respectively.

When the first charging terminal 173 of the robot cleaner 100 makes contact with the second charging terminal 273 of the charging device 200 or the first charging terminal 173 is just located close the second charging terminal 273, the first and second object sensors 321 and 322 may detect the first and second objects 311 and 312.

Figure 18:
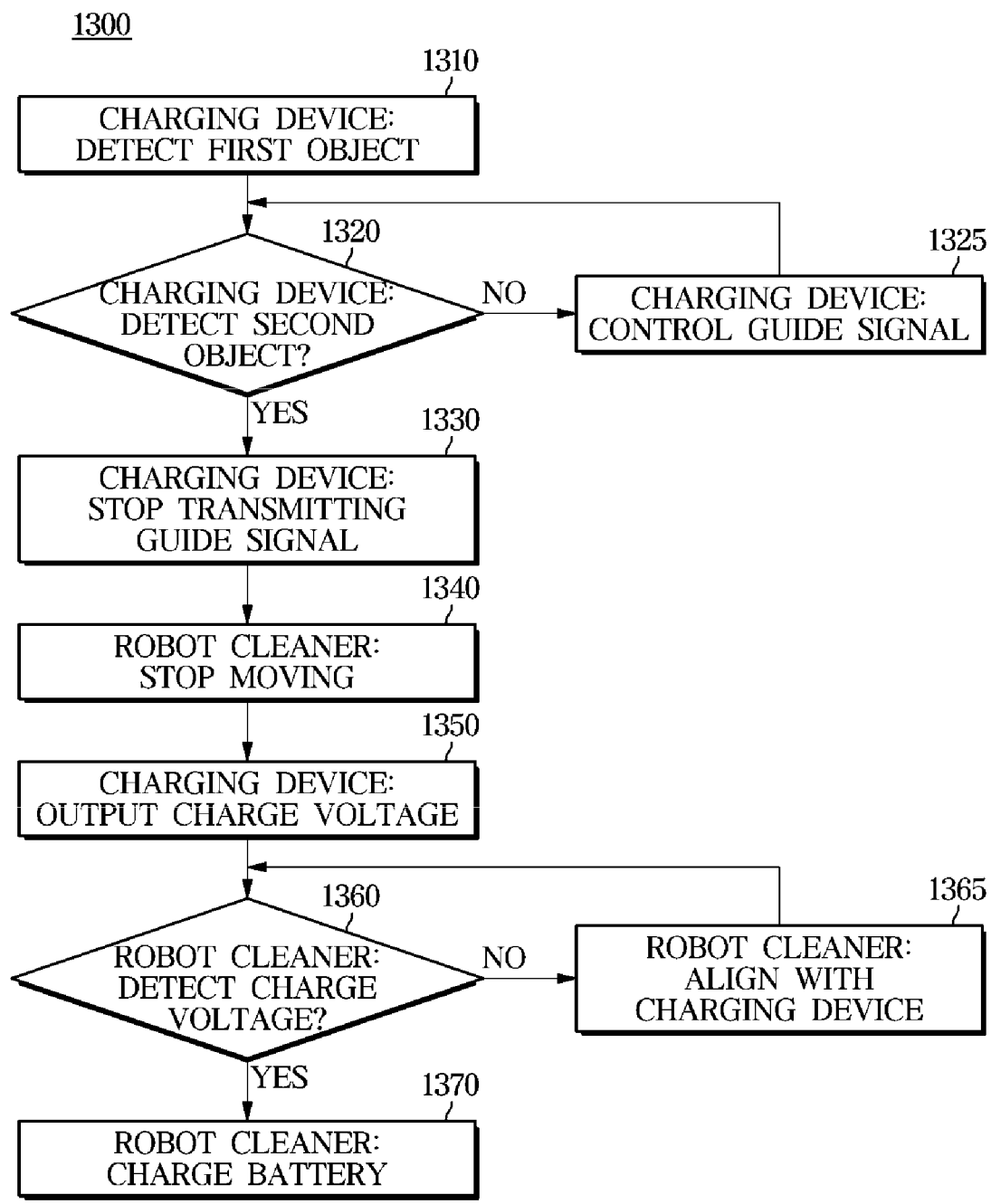
FIG. 18 shows an example of docking and charging operations of the robot cleaner and charging device shown in FIG. 16 according to an embodiment of the disclosure.
Figure 19:
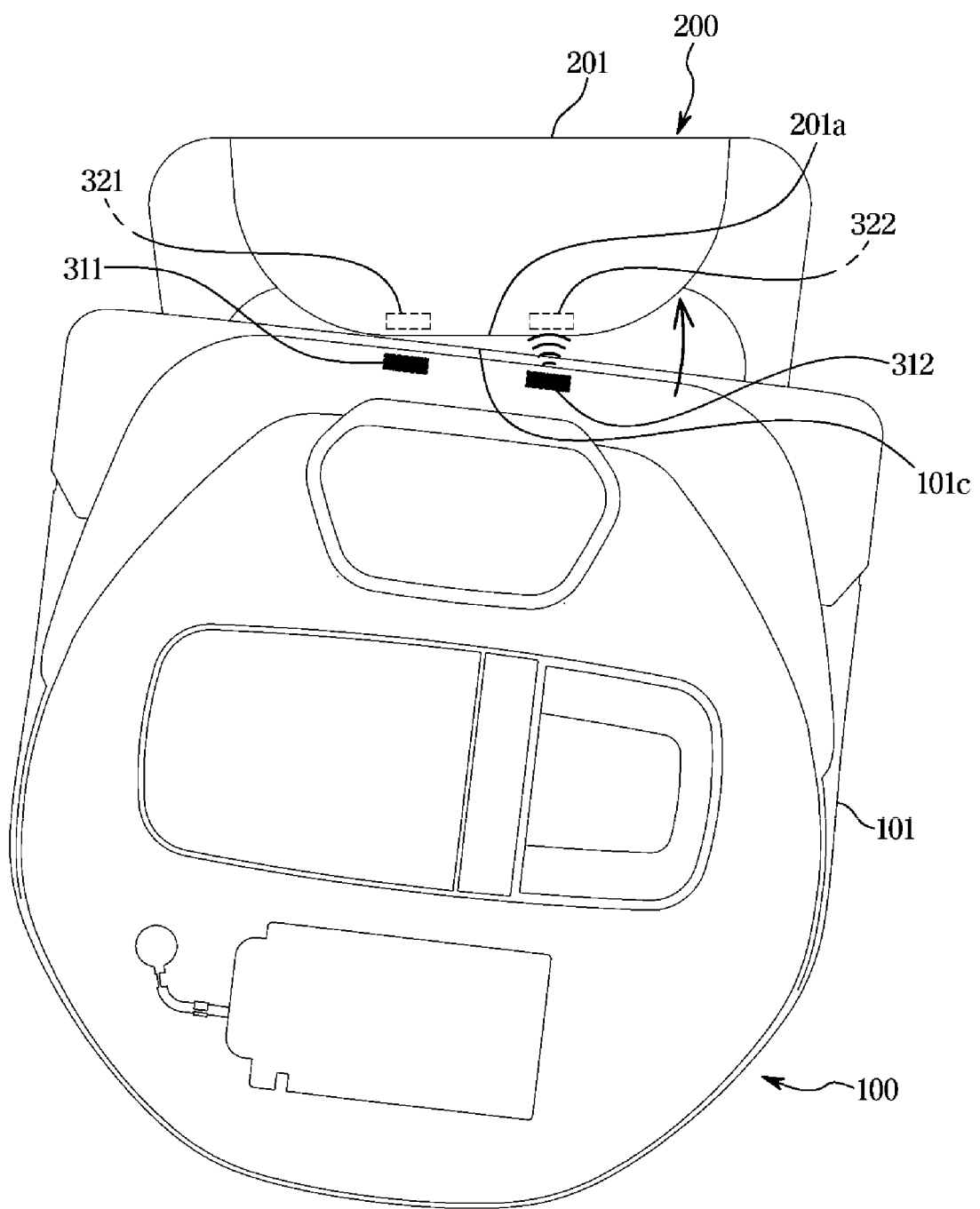
FIG. 19 shows alignment between the robot cleaner and the charging device shown in FIG. 16 according to an embodiment of the disclosure.

FIG. 18 shows an example of docking and charging operations of the robot cleaner and charging device shown in FIG. 16 according to an embodiment of the disclosure. FIG. 19 shows alignment between the robot cleaner and the charging device shown in FIG. 16 according to an embodiment of the disclosure.

Docking and charging operation 1300 of the robot cleaner 100 and the charging device 200 will be described in connection with FIGS. 18 and 19.

The first object sensor 321 of the charging device 200 detects the first object 311 of the robot cleaner 100, in operation 1310.

The robot cleaner 100 may move close to the charging device 200 according to the guide signal of the charging device 200. When the robot cleaner 100 is located in the designated position to dock with the charging device 200, the first object sensor 321 of the charging device 200 may detect the first object 311 installed at the robot cleaner 100.

The first object sensor 321 may send a first docking identification signal to the charging controller 290 when detecting the first object 311.

In response to the detection of the first object 311, the charging device 200 determines whether the second object sensor 322 detects the second object 312 of the robot cleaner 100, in operation 1320.

The charging controller 290 may determine whether the second object sensor 322 detects the second object 312 based on a signal output from the second object sensor 322.

When the second object sensor 322 fails to detect the second object 312 in 1320, the charging device 200 controls direction of the guide signal in operation 1325.

Even when the first object sensor 321 detects the first object 311, the second object sensor 322 might not detect the second object 312. For example, as shown in FIG. 19, when the front face 101*c* of the robot cleaner 100 is not aligned with the front face 201*a* of the charging device 200, one of the first and second object sensors 321 and 322 may detect the object 311 or 312 while the other of the first and second object sensors 321 and 322 may not detect the object 311 or 312.

When the second object sensor 322 does not detect the second object 312, the charging controller 290 may control the direction of the guide signal to align the front face 101*c* of the robot cleaner 100 with the front face 201*a* of the charging device 200.

For example, as shown in FIG. 19, when the right side of the front face 101*c* of the robot cleaner 100 is not aligned, the second object sensor 322 of the charging device 200 fails to detect the second object 312 arranged on the right side of the front face 101*c* of the robot cleaner 100. When the second object sensor 322 fails to detect the second object 312, the charging controller 290 may control the signal transmitter 281 to have the guide signal biased to the right. For example, the charging controller 290 may control the signal transmitter 281 to have the center guide signal 281a biased to the right from the center of the base 202.

While controlling the direction of the guide signal, the charging controller 290 may determine whether the second object sensor 322 detects the second object 312 of the robot cleaner 100 based on a signal output from the second object sensor 322.

When the first and second object sensors 321 and 322 detect the first and second objects 311 and 312, respectively, in 1320, the charging device 200 stops transmitting the guide signal, in operation 1330. In response to the charging device 200 stopping transmission of the guide signal, the robot cleaner 100 stops moving, in operation 1340. After stopping transmission of the guide signal, the charging device 200 outputs a charge voltage, in operation 1350. After stopping moving, the robot cleaner 100 determines whether the charge voltage of the charging device 200 is detected, in 1360. When the charge voltage of the charging device 200 is not detected in operation 1360, the robot cleaner 100 aligns with the charging device 200, in 1365. When the charge voltage of the charging device 200 is detected in operation 1360, the robot cleaner 100 charges the battery 171, in operation 1370.

Operations 1330, 1340, 1350, 1360, 1365, and 1370 may be the same as the operations 1120, 1130, 1140, 1150, 1155, and 1160 shown in FIG. 12, respectively.

As described above, the robot cleaner 100 includes the plurality of objects 311 and 312, and the charging device 200 may include the plurality of object sensors 321 and 322 to detect the plurality of objects 311 and 312, respectively.

Accordingly, the charging device 200 may identify more accurately whether the robot cleaner 100 is located at the designated position for docking. As compared with the occasion of using a single object and a single object sensor, using the plurality of objects 311 and 312 and the plurality of object sensors 321 and 322 may facilitate more accurate identification of whether the first charging terminal 173 of the robot cleaner 100 is aligned with the second charging terminal 273 of the charging device 200.

As a result, this may prevent the charge voltage from being applied to the second charging terminal 273 while the second charging terminal 273 is exposed to the outside to identify whether the robot cleaner 100 docks with the charging device 200, and may guide docking of the robot cleaner 100 more quickly.

When the output voltage of the battery 171 is lower than the minimum voltage (in so called a completely discharged state), the user U may put the robot cleaner 100 into the designated position to dock with the charging device 200.

When the user U puts the robot cleaner 100 into the designated position to dock with the charging device 200, the first and second object sensors 321 and 322 of the charging device 200 may detect the first and second objects 311 and 312 installed at the robot cleaner 100, respectively.

When one of the first and second object sensors 321 and 322 fails to detect one of the first and second objects 311 and 312, the charging device 200 may notify the user U that the robot cleaner 100 has not docked with the charging device 200. For example, the charging device 200 may make an LED flicker or output a buzzer sound through a speaker.

When all of the first and second object sensors 321 and 322 detect the first and second objects 311 and 312, the charging device 200 may apply a charge voltage and charge current to the robot cleaner 100 through the second charging terminal 273, and the robot cleaner 100 may charge the battery 171 with the charge voltage and charge current from the charging device 200.

Figure 20:
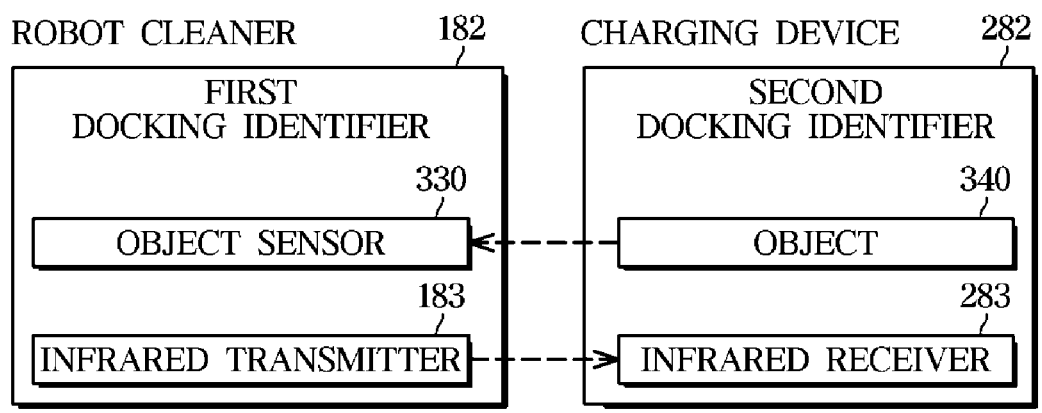
FIG. 20 shows a first docking identifier of a robot cleaner and a second docking identifier of a charging device, according to an embodiment of the disclosure.

FIG. 20 shows a first docking identifier of a robot cleaner and a second docking identifier of a charging device, according to an embodiment of the disclosure.

Referring to FIG. 20, the robot cleaner 100 includes an object sensor 330 and an infrared transmitter 183, and the charging device 200 includes an object 340 and an infrared receiver 283. The object sensor 330 of the robot cleaner 100 and the object 340 of the charging device 200 may be the same as the object sensor 320 of the charging device 200 and the object 310 of the robot cleaner 100 shown in FIG. 10, respectively.

To identify whether the robot cleaner 100 is located at the designated position to dock with the charging device 200, the object 340 may be arranged at a location corresponding to the object sensor 330.

For example, the object sensor 330 may be arranged on the front face 101c of the robot cleaner 100 while the object 340 may be arranged on the front face 201a of the charging device 200.

In another example, the object sensor 330 may be arranged between a pair of electrodes included in the first charging terminal 173, and the object 340 may be arranged between a pair of electrodes included in the second charging terminal 273.

When the robot cleaner 100 is located in the designated position to dock with the charging device 200, the object sensor 330 of the robot cleaner 100 may detect the object 340 installed at the charging device 200. Specifically, when the first charging terminal 173 of the robot cleaner 100 makes contact with the second charging terminal 273 of the charging device 200 or the first charging terminal 173 is just located close the second charging terminal 273, the object sensor 330 of the robot cleaner 100 may detect the object 340 of the charging device 200.

When the robot cleaner 100 is located at the designated position to dock with the charging device 200, the infrared transmitter 183 of the robot cleaner 100 may transmit an infrared ray that includes a communication message to the infrared receiver 283 of the charging device 200.

The robot cleaner 100 may transmit the communication message to the charging device 200 through the infrared transmitter 183. For example, the robot cleaner 100 may transmit the communication message to initiate charging to the charging device 200 through the infrared transmitter 183 when the object sensor 330 detects the object 340.

The infrared transmitter 183 may modulate the infrared ray based on the communication message. For example, the infrared transmitter 183 may transmit a series of infrared pulses that represent the communication message. The infrared transmitter 183 may transmit infrared pulses with different pulse widths and/or consecutive infrared pulses with different off periods.

The infrared receiver 283 of the charging device 200 may receive the infrared ray including the communication message from the infrared transmitter 183 of the robot cleaner 100 when the robot cleaner 100 is located at the designated position to dock with the charging device 200.

The infrared receiver 283 may obtain the communication message by demodulating the received infrared ray. For example, the infrared transmitter 183 may obtain the communication message of the robot cleaner 100 from the series of infrared pulses.

The charging device 200 may receive the communication message of the robot cleaner 100 through the infrared receiver 283. The charging device 200 may receive the communication message to initiate charging from the robot cleaner 100 through the infrared receiver 283, and output the charge voltage.

Figure 21:
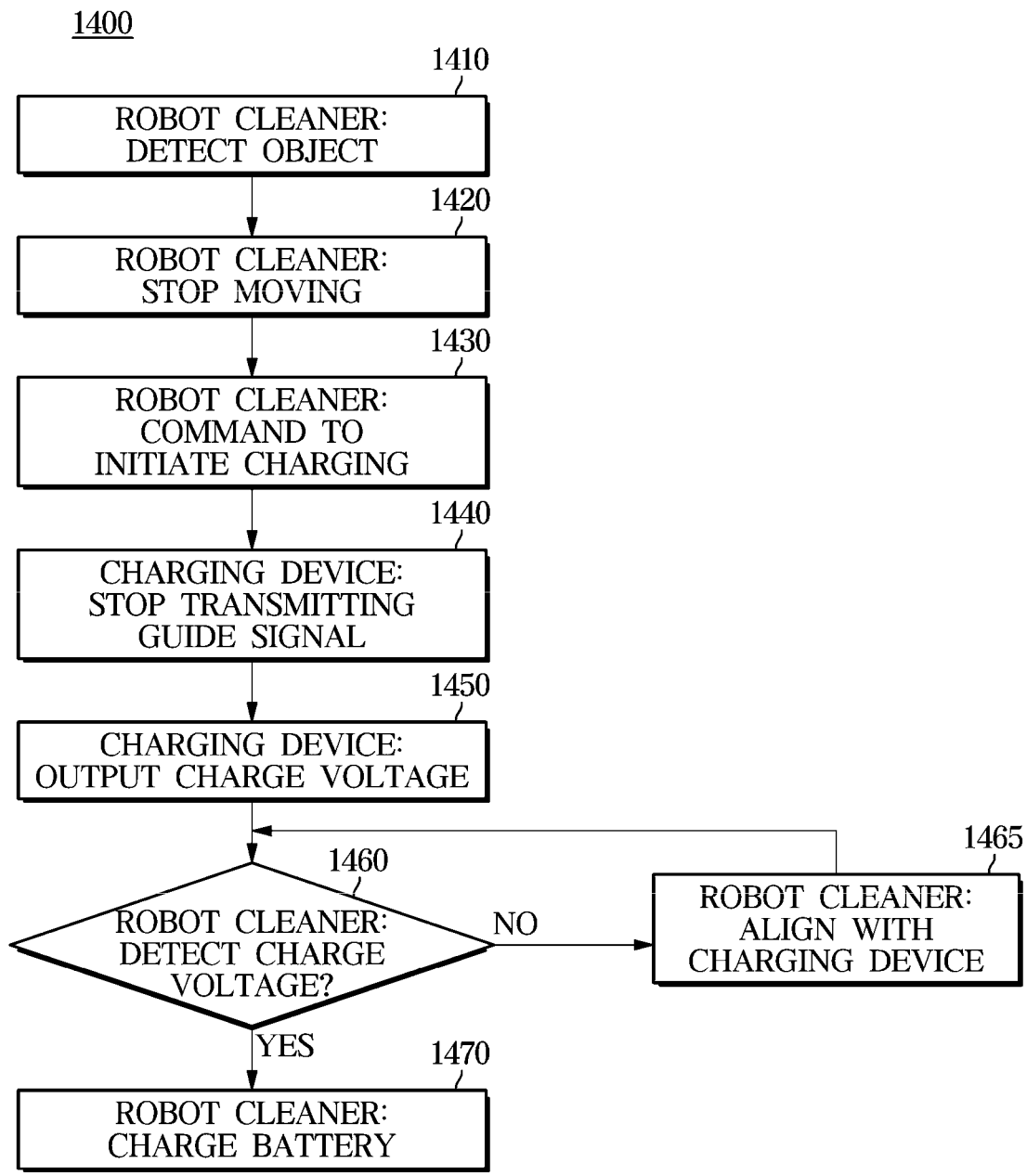
FIG. 21 shows an example of docking and charging operations of the robot cleaner and charging device shown in FIG. 20 according to an embodiment of the disclosure.

FIG. 21 shows an example of docking and charging operations of the robot cleaner and charging device shown in FIG. 20 according to an embodiment of the disclosure.

Docking and charging operation 1400 of the robot cleaner 100 and the charging device 200 will be described in connection with FIG. 21.

The object sensor 330 of the robot cleaner 100 detects the object 340 of the charging device 200, in operation 1410.

The robot cleaner 100 may move close to the charging device 200 according to the guide signal of the charging device 200. When the robot cleaner 100 is located in the designated position to dock with the charging device 200, the object sensor 330 of the robot cleaner 100 may detect the object 340 installed at the charging device 200. For example, when the robot cleaner 100 is located in the designated position to dock with the charging device 200, a hall sensor of the robot cleaner 100 may detect a magnetic field around a permanent magnet installed at the charging device 200.

The object sensor 320 may send a docking identification signal to the charging controller 290 when detecting the object 310.

The object sensor 330 of the robot cleaner 100 may send a docking identification signal to the robot controller 190 when detecting the object 340 of the charging device 200.

In response to the object sensor 330 detecting the object 340, the robot cleaner 100 stops moving, in operation 1420.

The robot controller 190 may identify that the robot cleaner 100 is located at the designated position to dock with the charging device 200 based on the docking identification signal received from the object sensor 330. The robot controller 190 may control the drive 140 to stop moving the robot cleaner 100 and stay at the designated position for docking.

After stopping moving, the robot cleaner 100 transmits a command to initiate charging to the charging device 200, in operation 1430.

After stopping moving, the robot controller 190 may control the infrared transmitter 183 to transmit the communication message to initiate charging to the charging device 200. The infrared transmitter 183 may transmit a series of infrared pulses that represent the communication message to initiate charging. For example, the infrared transmitter 183 may transmit infrared pulses with pulse width that represents the communication message to initiate charging and/or infrared pulses with off periods that represent the communication message to initiate charging.

When the robot cleaner 100 receives the communication message to initiate charging of the robot cleaner 100, the charging device 200 stops transmitting the guide signal, in operation 1440.

The charging controller 290 may receive the communication message to initiate charging from the robot cleaner 100 through the infrared receiver 283. The infrared receiver 283 may receive a series of infrared pulses representing the communication message to initiate charging, and send the communication message to the charging controller 290.

The charging controller 290 may identify that the robot cleaner 100 is located at the designated position to dock with the charging device 200 when the communication message to initiate charging is received. Furthermore, the charging controller 290 may control the signal transmitter 281 to stop transmitting the guide signal.

After stopping transmission of the guide signal, the charging device 200 outputs a charge voltage, in operation 1450.

After the transmission of the guide signal is stopped, the charging controller 290 may control the charger 270 to output power through the second charging terminal 273. For example, the charging controller 290 may control the dc-dc converter 272 to apply the voltage of 24.9V to the second charging terminal 273.

After transmitting the command to initiate charging, the robot cleaner 100 determines whether the charge voltage of the charging device 200 is detected, in operation 1460.

The robot controller 190 may measure the charge voltage applied to the first charging terminal 173 by using the divider 174. When the first charging terminal 173 of the robot cleaner 100 makes contact with the second charging terminal 273 of the charging device 200, the robot controller 190 may measure the charge voltage applied to the first charging terminal 173 through the divider 174. When the first charging terminal 173 of the robot cleaner 100 is not in contact with the second charging terminal 273 of the charging device 200, the robot controller 190 may not measure the charge voltage applied to the first charging terminal 173.

When the charge voltage of the charging device 200 is not detected in operation 1460, the robot cleaner 100 aligns with the charging device 200, in operation 1465.

When the robot cleaner 100 is located at a position different from but near the designated position for docking, the robot controller 190 may control the drive 140 for the robot cleaner 100 to move to the designated position for docking. For example, the robot controller 190 may control the movement of the robot cleaner 100 based on the output of the detector 120, or turn the robot cleaner 100 clockwise or counterclockwise in the same place.

When the charge voltage of the charging device 200 is detected in operation 1460, the robot cleaner 100 charges the battery 171, in operation 1470.

The robot controller 190 may close (turn on) the switch 175 to charge the battery 171 when the voltage output from the divider 174 that scales down the voltage applied to the first charging terminal 173 is equal to or higher than the reference voltage. Turning on the switch 175 may lead to charging the battery 171.

As described above, the robot cleaner 100 may use the object sensor 330 to identify whether the robot cleaner 100 is located at the designated position for docking with the charging device 200, and request the charging device 200 to initiate charging. This may prevent the charge voltage from being applied to the second charging terminal 273 while the second charging terminal 273 is exposed to the outside to identify whether the robot cleaner 100 docks with the charging device 200. It may further prevent safety accidents that might occur when a voltage is applied to an exposed charging terminal.

Figure 22:
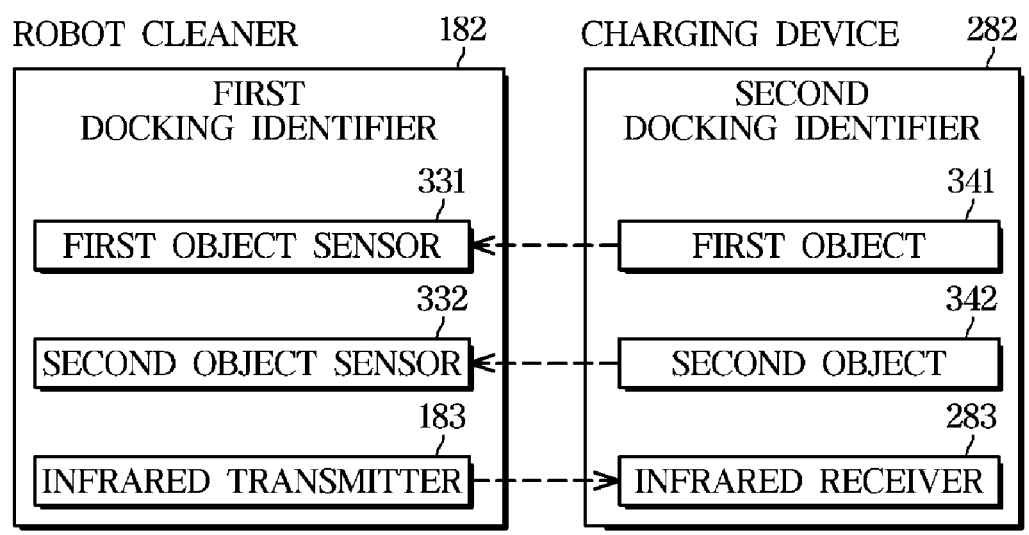
FIG. 22 shows a first docking identifier of a robot cleaner and a second docking identifier of a charging device, according to an embodiment of the disclosure.

FIG. 22 shows a first docking identifier of a robot cleaner and a second docking identifier of a charging device, according to an embodiment of the disclosure.

Referring to FIG. 22, the robot cleaner 100 includes a first object sensor 331, a second object sensor 332, and the infrared transmitter 183. The charging device 200 includes a first object 341, a second object 342, and the infrared receiver 283. Each of the first and second object sensors 331 and 332 of the robot cleaner 100 and each of the first and second objects 341 and 342 of the charging device 200 may be the same as the object sensor 320 of the charging device 200 shown in FIG. 20 and the object 310 of the robot cleaner 100 shown in FIG. 20, respectively.

To identify whether the robot cleaner 100 is located at the designated position to dock with the charging device 200, the first and second object sensors 331 and 332 may be arranged at locations corresponding to the first and second objects 341 and 342.

For example, the first and second object sensors 331 and 332 may be arranged separately on the front face 101c of the robot cleaner 100 while the first and second objects 341 and 342 may be arranged separately on the front face 201a of the charging device 200.

In another example, the first and second objects 331 and 332 may be arranged around a pair of electrodes included in the first charging terminal 173, respectively, and the first and second objects 341 and 342 may be arranged around a pair of electrodes included in the second charging terminal 273, respectively.

When the robot cleaner 100 is located at the designated position to dock with the charging device 200, the first and second object sensors 331 and 332 of the robot cleaner 100 may detect the first and second objects 341 and 342 of the charging device 200.

The infrared transmitter 183 and the infrared receiver 283 may be the same as those shown in FIG. 20.

Figure 23:
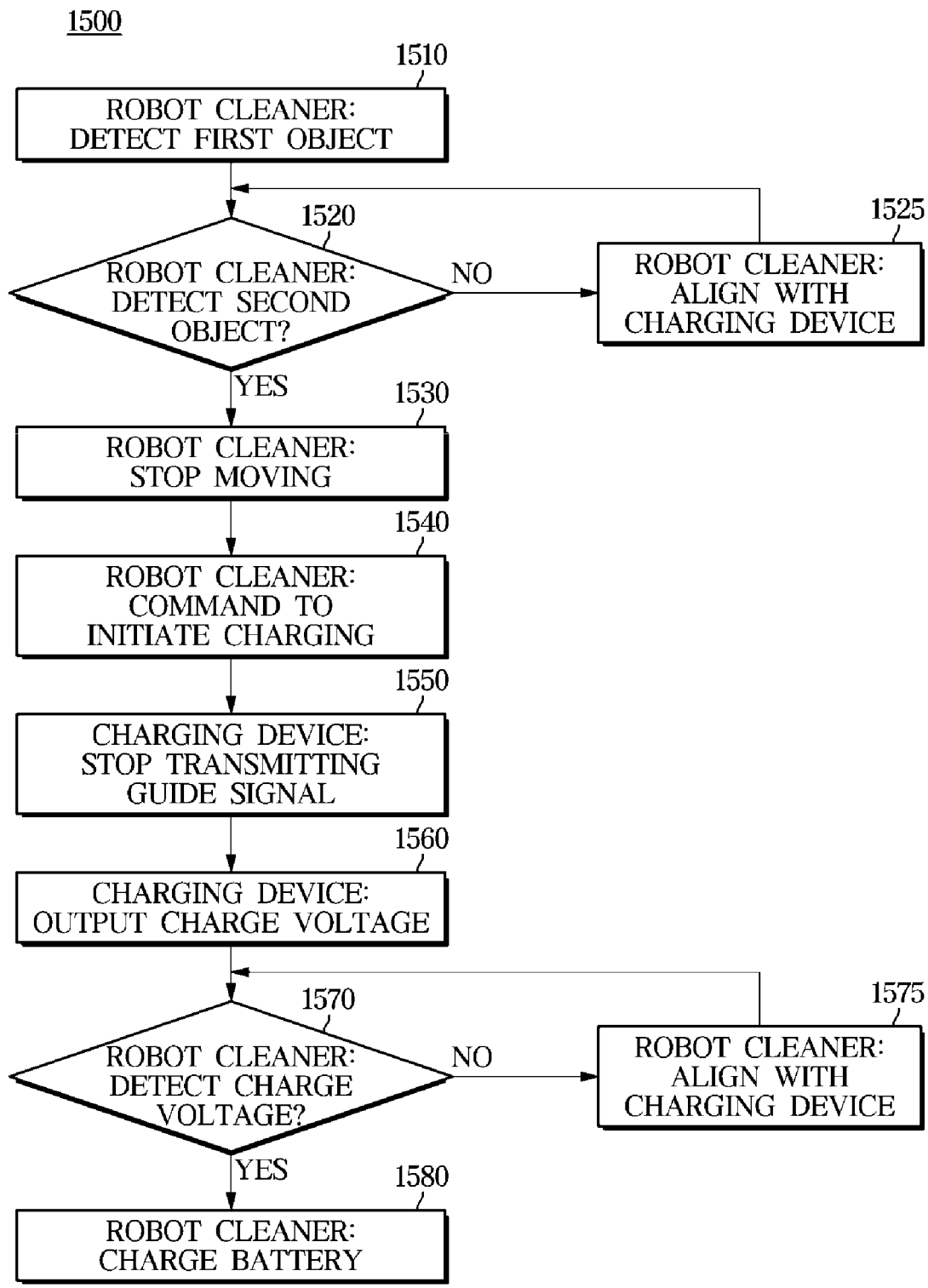
FIG. 23 shows an example of docking and charging operations of the robot cleaner and charging device shown in FIG. 22 according to an embodiment of the disclosure.

FIG. 23 shows an example of docking and charging operations of the robot cleaner and charging device shown in FIG. 22 according to an embodiment of the disclosure.

Docking and charging operation 1500 of the robot cleaner 100 and the charging device 200 will be described in connection with FIG. 23.

The first object sensor 331 of the robot cleaner 100 detects the first object 341 of the charging device 200, in operation 1510.

When the robot cleaner 100 is located in the designated position to dock with the charging device 200, the first object sensor 331 of the robot cleaner 100 may detect the first object 341 installed at the charging device 200.

The first object sensor 331 may send a first docking identification signal to the robot controller 190 when detecting the first object 341.

In response to the detection of the first object 341 by the first object sensor 331, the robot cleaner 100 determines whether the second object sensor 332 detects the second object 342 of the charging device 200, in operation 1520.

The robot controller 190 may determine whether the second object sensor 332 detects the second object 342 based on a signal output from the second object sensor 332.

When the second object sensor 332 fails to detect the second object 342 in 1520, the robot cleaner 100 aligns with the charging device 200, in operation 1525.

For example, when the front face 101c of the robot cleaner 100 is not aligned with the front face 201a of the charging device 200, the first object sensor 331 may detect the first object 341 while the second object sensor 332 may not detect the second object 342.

The robot controller 190 may control the drive 140 such that the front face 101c of the robot cleaner 100 is aligned with the front face 201a of the charging device 200. For example, the robot controller 190 may control motion of the robot cleaner 100 based on the output of the detector 120, or turn the robot cleaner 100 clockwise or counterclockwise in the same place.

When the first and second object sensors 331 and 332 detect the first and second objects 341 and 342, respectively, in 1520, the robot cleaner 100 stops moving, in 1530. After stopping moving, the robot cleaner 100 transmits a command to initiate charging to the charging device 200, in operation 1540. When the robot cleaner 100 receives the communication message to initiate charging of the robot cleaner 100, the charging device 200 stops transmitting the guide signal, in operation 1550. After stopping transmission of the guide signal, the charging device 200 outputs a charge voltage, in operation 1560. After transmitting the command to initiate charging, the robot cleaner 100 determines whether the charge voltage of the charging device 200 is detected, in 1570. When the charge voltage of the charging device 200 is not detected in 1570, the robot cleaner 100 aligns with the charging device 200, in operation 1575. When the charge voltage of the charging device 200 is detected in operation 1570, the robot cleaner 100 charges the battery 171, in operation 1580.

Operations 1530, 1540, 1550, 1560, 1570, 1575, and 1580 may be the same as the operations 1420, 1430, 1440, 1450, 1460, 1465, and 1470 shown in FIG. 21, respectively.

As described above, the robot cleaner 100 includes the plurality of object sensors 331 and 332, and the charging device 200 may include the plurality of objects 341 and 342. This may enable the robot cleaner 100 to identify more accurately whether the robot cleaner 100 is located at the designated position to dock with the charging device 200.

As a result, the charge voltage is prevented from being applied to the second charging terminal 273 while the second charging terminal 273 is exposed to the outside to identify whether the robot cleaner 100 docks with the charging device 200, and the robot cleaner 100 may dock with the charging device 200 more quickly.

Figure 24:
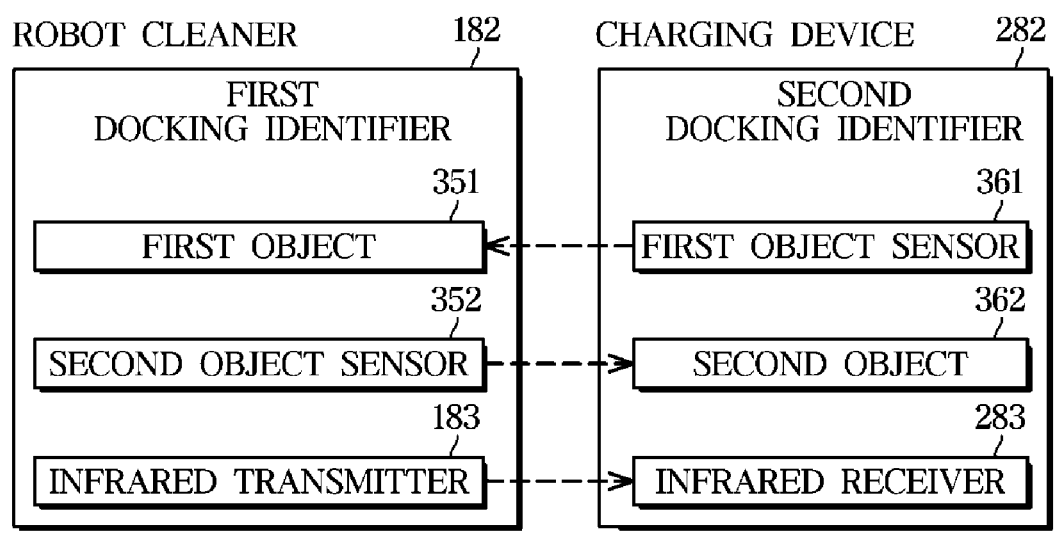
FIG. 24 shows a first docking identifier of a robot cleaner and a second docking identifier of a charging device, according to an embodiment of the disclosure.

FIG. 24 shows a first docking identifier of a robot cleaner and a second docking identifier of a charging device, according to an embodiment of the disclosure.

Referring to FIG. 24, the robot cleaner 100 includes a first object 351, a second object sensor 352, and the infrared transmitter 183. The charging device 200 includes a first object sensor 361, a second object 362, and the infrared receiver 283. The first object sensor 361 of the charging device 200 and the second object sensor 352 of the robot cleaner 100 may be the same as the object sensor 320 of the charging device 200 shown in FIG. 20, and the first object 351 of the robot cleaner 100 and the second object 362 of the charging device 200 may be the same as the object 310 of the robot cleaner 100 shown in FIG. 20.

To identify whether the robot cleaner 100 is located in the designated position to dock with the charging device 200, the first object sensor 361 of the charging device 200 may be arranged at a position corresponding to the first object 351 of the robot cleaner 100. The second object sensor 352 of the robot cleaner 100 may be arranged at a position corresponding to the second object 362 of the charging device 200.

For example, the first object 351 and the second object sensor 352 may be arranged separately on the front face 101c of the robot cleaner 100 while the first object sensor 361 and the second object 362 may be arranged separately on the front face 201a of the charging device 200.

In another example, the first object 351 and the second object sensor 352 may be arranged around a pair of electrodes included in the first charging terminal 173, respectively, and the first object sensor 361 and the second object 362 may be arranged around a pair of electrodes included in the second charging terminal 273, respectively.

Accordingly, when the robot cleaner 100 is located in the designated position to dock with the charging device 200, the first object sensor 361 of the charging device 200 may detect the first object 351 of the robot cleaner 100, and the second object sensor 352 of the robot cleaner 100 may detect the second object 362 of the charging device 200.

The infrared transmitter 183 and the infrared receiver 283 may be the same as those shown in FIG. 20.

Figure 25:
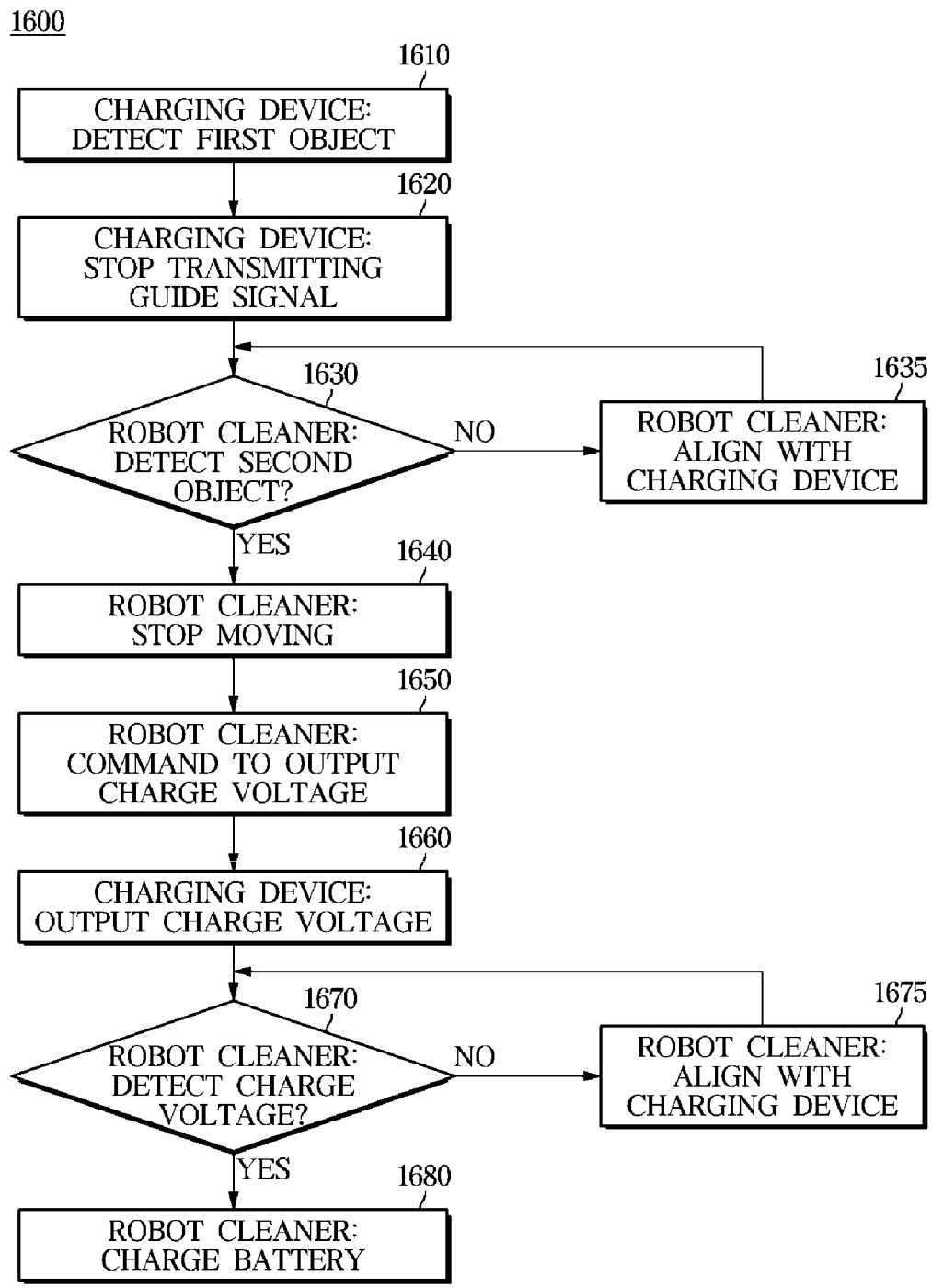
FIG. 25 shows an example of docking and charging operations of the robot cleaner and charging device shown in FIG. 24 according to an embodiment of the disclosure.
Figure 26:
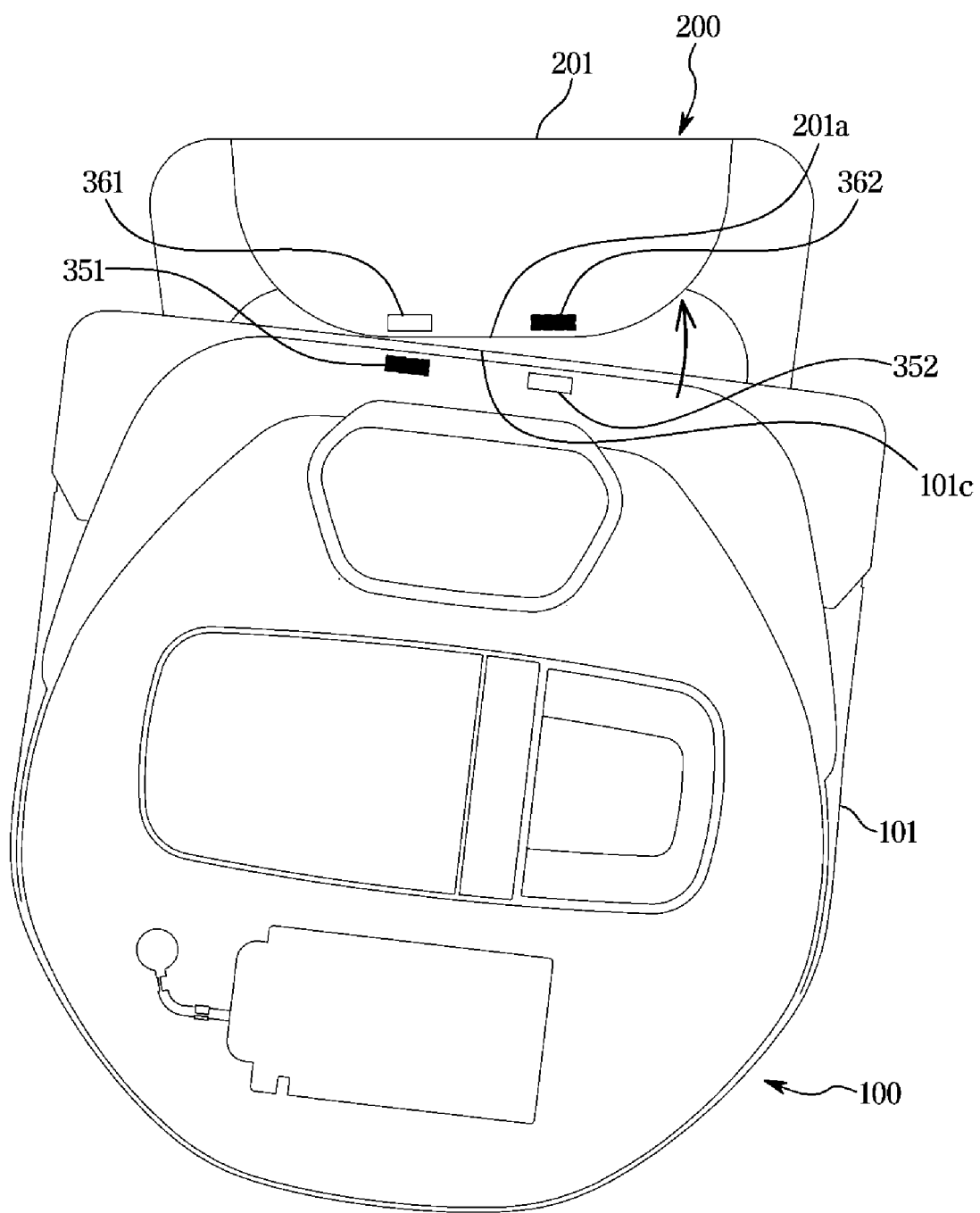
FIG. 26 shows alignment between the robot cleaner and the charging device shown in FIG. 24 according to an embodiment of the disclosure.

FIG. 25 shows an example of docking and charging operations of the robot cleaner and charging device shown in FIG. 24 according to an embodiment of the disclosure. FIG. 26 shows alignment between the robot cleaner and the charging device shown in FIG. 24 according to an embodiment of the disclosure.

Docking and charging operation 1600 of the robot cleaner 100 and the charging device 200 will be described in connection with FIGS. 25 and 26.

The first object sensor 361 of the charging device 200 detects the first object 351 of the robot cleaner 100, in operation 1610.

When the robot cleaner 100 is located in the designated position to dock with the charging device 200, the first object sensor 361 of the charging device 200 may detect the first object 351 of the robot cleaner 100.

The first object sensor 361 may send a docking identification signal to the charging controller 290 when detecting the first object 351.

In response to the first object sensor 361 detecting the first object 351, the charging device 200 stops transmitting the guide signal, in operation 1620.

When the charging device 200 stops transmitting the guide signal, the robot cleaner 100 determines whether the second object sensor 352 detects the second object 362 of the charging device 200, in operation 1630.

The robot controller 190 may determine whether the second object sensor 352 detects the second object 362 based on a signal output from the second object sensor 352.

When the second object sensor 352 fails to detect the second object 362 in 1630, the robot cleaner 100 aligns with the charging device 200, in operation 1635.

As shown in FIG. 26, when the front face 101c of the robot cleaner 100 is not aligned with the front face 201a of the charging device 200, the first object sensor 361 may detect the first object 351 while the second object sensor 352 may not detect the second object 362.

To align the front face 101c of the robot cleaner 100 with the front face 201a of the charging device 200, the robot controller 190 may control the motion of the robot cleaner 100 or turn the robot cleaner 100 clockwise or counterclockwise in the same place based on the output of the detector 120.

When the second object sensor 352 detects the second object 362 in 1630, the robot cleaner 100 stops moving, in operation 1640. After stopping moving, the robot cleaner 100 transmits a command to initiate charging to the charging device 200, in operation 1650. Upon reception of the communication message to initiate charging the robot cleaner 100, the charging device 200 outputs a charge voltage, in operation 1660. After transmitting the command to initiate charging, the robot cleaner 100 determines whether the charge voltage of the charging device 200 is detected, in operation 1670. When the charge voltage of the charging device 200 is not detected in 1670, the robot cleaner 100 aligns with the charging device 200, in operation 1675. When the charge voltage of the charging device 200 is detected in operation 1670, the robot cleaner 100 charges the battery 171, in operation 1680.

Operations 1640, 1650, 1660, 1670, 1675, and 1680 may be the same as the operations 1420, 1430, 1450, 1460, 1465, and 1470 shown in FIG. 21, respectively.

Figure 27:
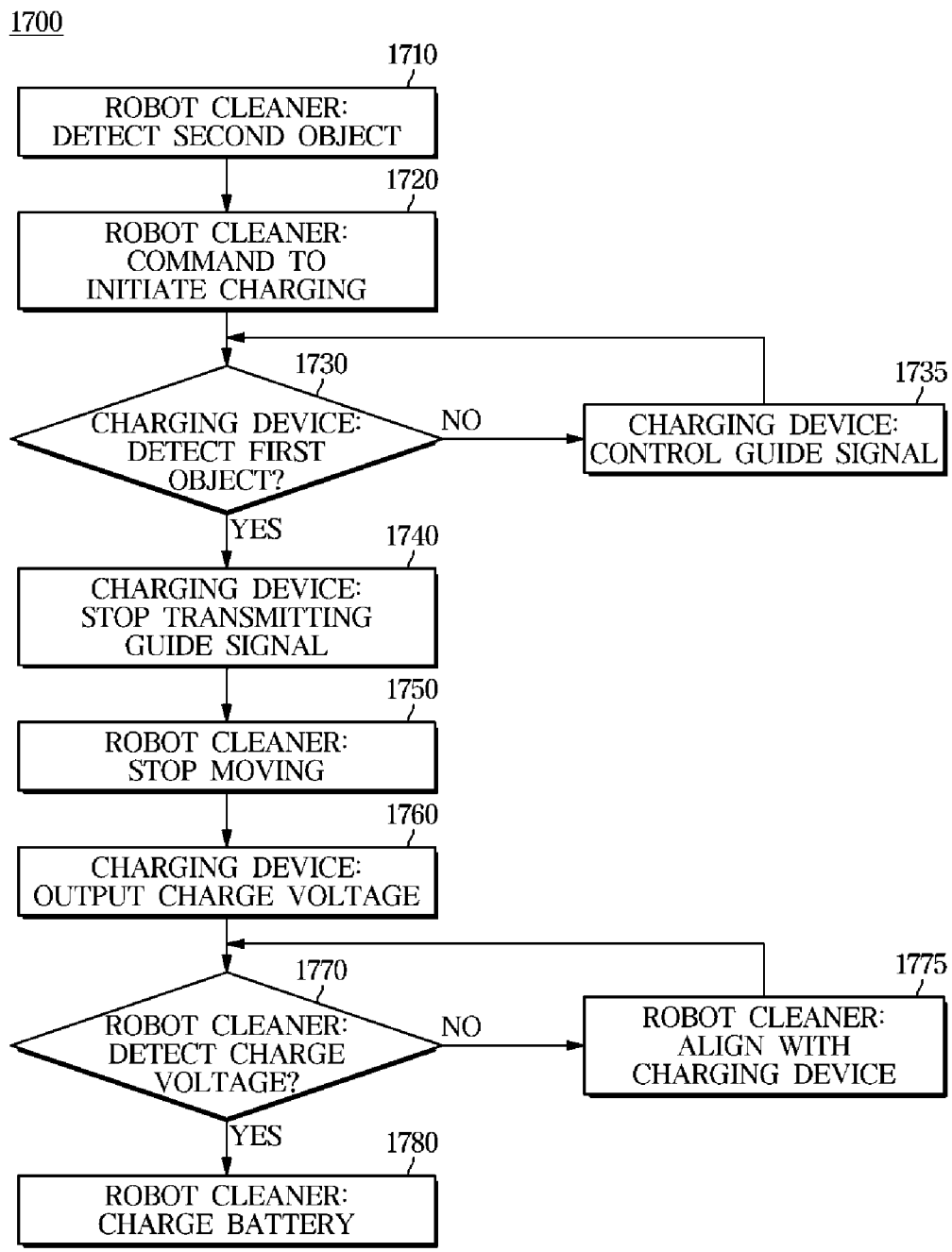
FIG. 27 shows another example of docking and charging operations of the robot cleaner and charging device shown in FIG. 24 according to an embodiment of the disclosure.

FIG. 27 shows an example of docking and charging operations of the robot cleaner and charging device shown in FIG. 24 according to an embodiment of the disclosure.

The example of docking and charging operation 1700 of the robot cleaner 100 and the charging device 200 will be described in connection with FIG. 27.

The second object sensor 352 of the robot cleaner 100 detects the second object 362 of the charging device 200, in operation 1710.

When the robot cleaner 100 is located in the designated position to dock with the charging device 200, the second object sensor 352 of the robot cleaner 100 may detect the second object 362 installed at the charging device 200.

The second object sensor 352 may send a docking identification signal to the robot controller 190 in response to the detection of the second object 362.

In response to the second object sensor 352 detecting the second object 362, the robot cleaner 100 transmits a command to initiate charging to the charging device 200, in operation 1720.

Operation 1720 may be the same as operation 1430 of FIG. 21.

Upon reception of the command to initiate charging, the charging device 200 determines whether the first object sensor 361 detects the first object 351 of the robot cleaner 100, in operation 1730.

The charging controller 290 may determine whether the second object sensor 352 detects the second object 362 based on the signal output from the first object sensor 361.

When the first object sensor 361 fails to detect the first object 351 in 1730, the charging device 200 controls direction of the guide signal in operation 1735.

When the front face 101c of the robot cleaner 100 is not aligned with the front face 201a of the charging device 200, the second object sensor 352 may detect the second object 362 while the first object sensor 361 may not detect the first object 351. The charging controller 290 may control the direction of the guide signal such that the front face 101c of the robot cleaner 100 is aligned with the front face 201a of the charging device 200.

When the first object sensor 361 detects the first object 351 in operation 1730, the charging device 200 stops transmitting the guide signal in operation 1740. In response to the charging device 200 stopping transmission of the guide signal, the robot cleaner 100 stops moving, in operation 1750. After stopping transmission of the guide signal, the charging device 200 outputs a charge voltage, in operation 1760. After stopping moving, the robot cleaner 100 determines whether the charge voltage of the charging device 200 is detected, in operation 1770. When the charge voltage of the charging device 200 is not detected in operation 1770, the robot cleaner 100 align with the charging device 200, in operation 1775. When the charge voltage of the charging device 200 is detected in operation 1770, the robot cleaner 100 charges the battery 171, in operation 1780.

Operations 1740, 1750, 1760, 1770, 1775, and 1780 may be the same as the operations 1120, 1130, 1140, 1150, 1155, and 1160 shown in FIG. 12, respectively.

As described above, the robot cleaner 100 may include an object and an object sensor, and the charging device 200 may also include an object and an object sensor. This may enable the charging device 200 to identify more accurately whether the robot cleaner 100 is located at the designated position for docking. Furthermore, it may allow the robot cleaner 100 to dock with the charging device more quickly.

Figure 28:
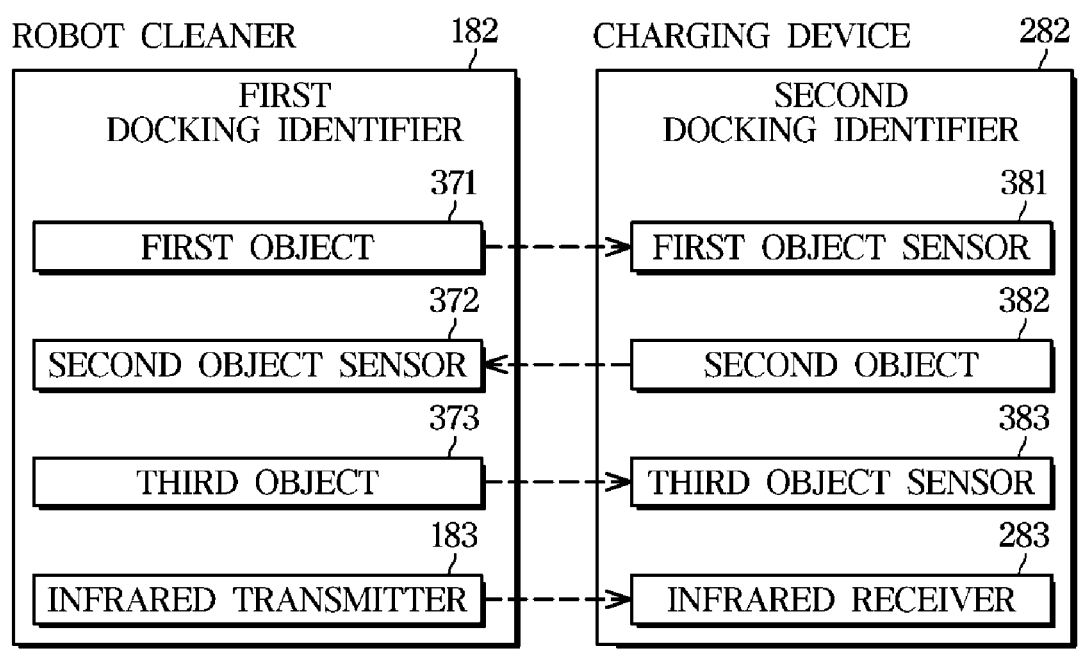
FIG. 28 shows a first docking identifier of a robot cleaner and a second docking identifier of a charging device, according to an embodiment of the disclosure.
Figure 29:
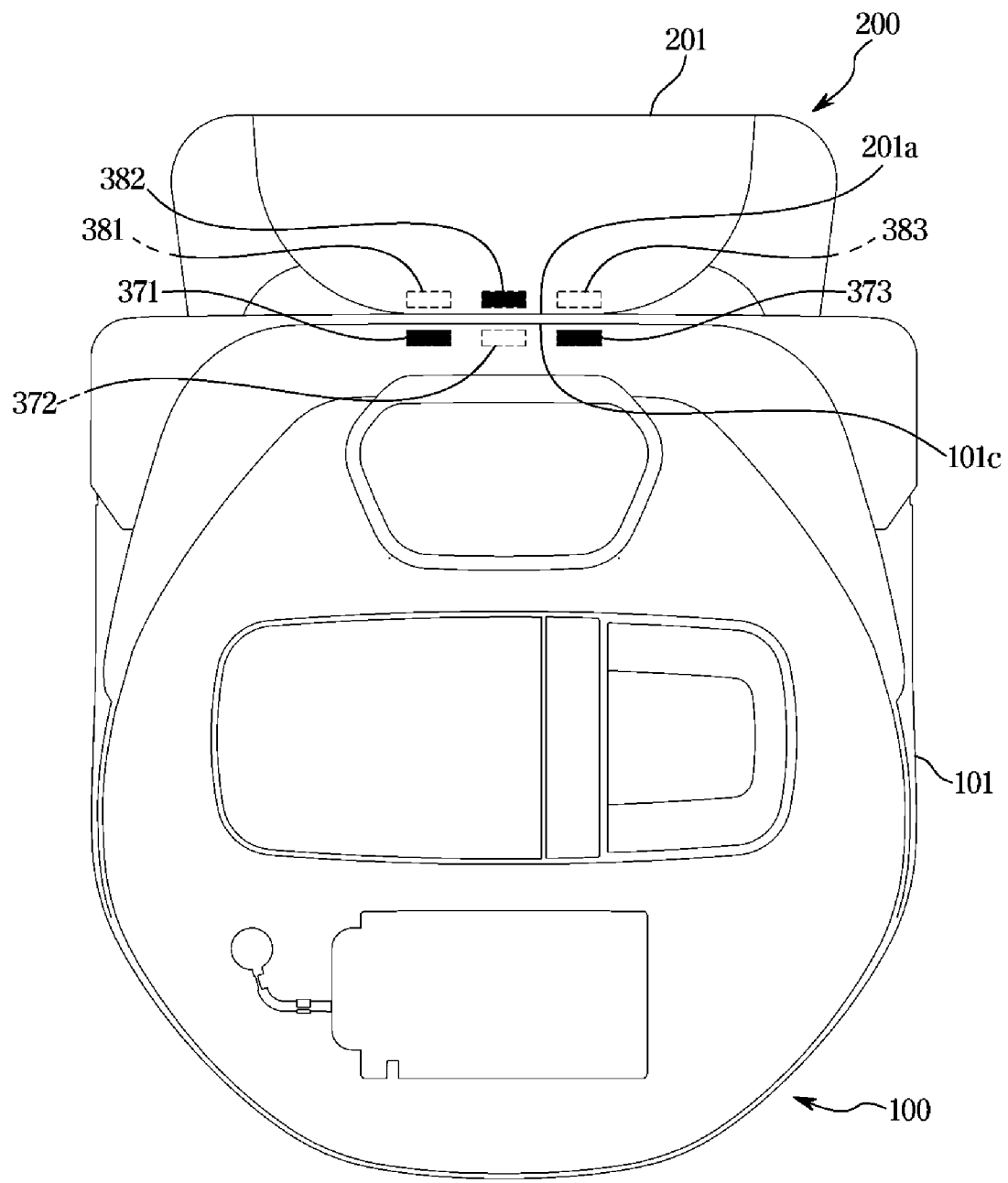
FIG. 29 shows where objects of the robot cleaner shown in FIG. 28 and object sensors of the charging device are installed according to an embodiment of the disclosure.

FIG. 28 shows a first docking identifier of a robot cleaner and a second docking identifier of a charging device, according to an embodiment of the disclosure. FIG. 29 shows where objects of the robot cleaner shown in FIG. 28 and object sensors of the charging device are installed according to an embodiment of the disclosure.

Referring to FIG. 28, the robot cleaner 100 includes a first object 371, a second object sensor 372, a third object 373, and the infrared transmitter 183. The charging device 200 includes a first object sensor 381, a second object 382, a third object sensor 383, and the infrared receiver 283. The first and third object sensors 381 and 383 of the charging device 200 and the second object sensor 372 of the robot cleaner 100 may be the same as the object sensor 320 of the charging device 200 shown in FIG. 20, and the first and third objects 371 and 373 of the robot cleaner 100 and the second object 382 of the charging device 200 may be the same as the object 310 of the robot cleaner 100 shown in FIG. 20.

To identify whether the robot cleaner 100 is located in the designated position to dock with the charging device 200, the first and third object sensors 381 and 383 of the charging device 200 may be arranged at positions corresponding to the first and third objects 371 and 373 of the robot cleaner 100. The second object sensor 372 of the robot cleaner 100 may be arranged at a position corresponding to the second object 382 of the charging device 200.

For example, as shown in FIG. 29, the first and third objects 371 and 373 may be arranged separately on the front face 101c of the robot cleaner 100 while the first and third object sensors 381 and 383 may be arranged separately on the front face 201a of the charging device 200. Furthermore, the second object 382 may be arranged between the first and third object sensors 381 and 383, and the second object sensor 372 may be arranged between the first and third objects 371 and 373.

In another example, the first and third objects 371 and 373 may be arranged around a pair of electrodes included in the first charging terminal 173, respectively, and the first and third object sensors 381 and 383 may be arranged around a pair of electrodes included in the second charging terminal 273, respectively. Furthermore, the second object sensor 372 may be arranged between the pair of electrodes included in the first charging terminal 173, and the second object 382 may be arranged between the pair of electrodes included in the second charging terminal 273.

Accordingly, when the robot cleaner 100 is located in the designated position to dock with the charging device 200, the first and third object sensors 381 and 383 of the charging device 200 may detect the first and third objects 371 and 373 of the robot cleaner 100, respectively, and the second object sensor 372 of the robot cleaner 100 may detect the second object 382 of the charging device 200.

The infrared transmitter 183 and the infrared receiver 283 may be the same as those shown in FIG. 20.

Figure 30:
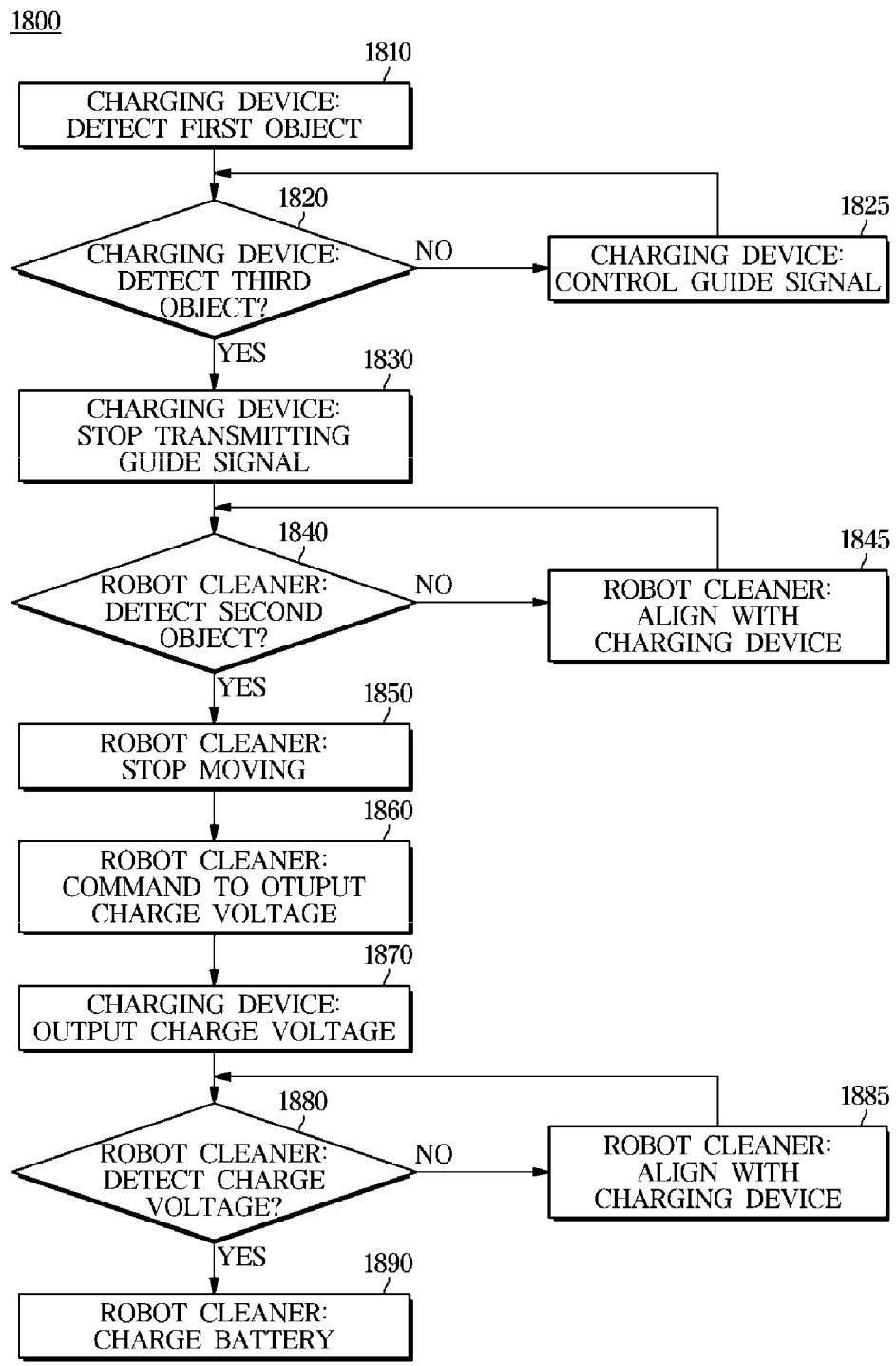
FIG. 30 shows alignment between the robot cleaner and the charging device shown in FIG. 28 according to an embodiment of the disclosure.

FIG. 30 shows alignment between the robot cleaner and the charging device shown in FIG. 28 according to an embodiment of the disclosure.

Docking and charging operation 1800 of the robot cleaner 100 and the charging device 200 will be described in connection with FIG. 30.

The first object sensor 381 of the charging device 200 detects the first object 371 of the robot cleaner 100, in operation 1810. In response to the detection of the first object 371, the charging device 200 determines whether the third object sensor 383 detects the third object 373 of the robot cleaner 100, in operation 1820. When the third object sensor 383 fails to detect the third object 373 in operation 1820, the charging device 200 controls direction of the guide signal in operation 1825. When the first and third object sensors 381 and 383 detect the first and third objects 371 and 373, respectively, in operation 1820, the charging device 200 stops transmitting the guide signal, in operation 1830.

Operations 1810, 1820, 1825, and 1830 may be the same as the operations 1310, 1320, 1325, and 1330 shown in FIG. 12, respectively.

When the charging device 200 stops transmitting the guide signal, the robot cleaner 100 determines whether the second object sensor 372 detects the second object 382 of the charging device 200, in operation 1840. When the second object sensor 372 fails to detect the second object 382 in operation 1840, the robot cleaner 100 aligns with the charging device 200, in operation 1845.

Operations 1840 and 1845 may be the same as the operations 1630 and 1635 shown in FIG. 25, respectively.

When the second object sensor 372 detects the second object 382 in operation 1840, the robot cleaner 100 stops moving, in operation 1850. After stopping moving, the robot cleaner 100 transmits a command to initiate charging to the charging device 200, in operation 1860. Upon reception of the communication message to initiate charging the robot cleaner 100, the charging device 200 outputs a charge voltage, in operation 1870. After transmitting the command to initiate charging, the robot cleaner 100 determines whether the charge voltage of the charging device 200 is detected, in 1880. When the charge voltage of the charging device 200 is not detected in operation 1880, the robot cleaner 100 aligns with the charging device 200, in operation 1885. When the charge voltage of the charging device 200 is detected in operation 1880, the robot cleaner 100 charges the battery 171, in operation 1890.

Operations 1850, 1860, 1870, 1880, 1885, and 1890 may be the same as the operations 1420, 1430, 1450, 1460, 1465, and 1470 shown in FIG. 21, respectively.

Meanwhile, the embodiments of the disclosure may be implemented in the form of recording media for storing instructions to be carried out by a computer. The instructions may be stored in the form of program codes, and when executed by a processor, may generate program modules to perform operation in the embodiments of the disclosure. The recording media may correspond to computer-readable recording media.

As described above, a robot cleaner may include a battery; a charging circuit including at least one terminal, at least a portion of the at least one terminal being exposed to the outside; at least one object sensor arranged separately from the at least one terminal for detecting at least one identification object arranged in a charging device; and a controller configured to control the charging circuit to charge the battery with a voltage applied to the at least one terminal from the charging device in response to the at least one object sensor detecting the at least one identification object.

This may prevent a voltage from being applied to the charging terminal while the charging terminal is exposed to the outside to identify whether the robot cleaner docks with the charging device.

The at least one object sensor may include at least one hall sensor for detecting at least one permanent magnet arranged at the charging device.

This may prevent the at least one object sensor from improperly detecting the at least one object.

The at least one object sensor may be installed on the front of the robot cleaner. The at least one terminal may include a pair of terminals, and the at least one object sensor may be installed between the pair of terminals.

This allows the at least one object sensor to detect the identification object, enabling the controller to accurately identify docking of the robot cleaner with the charging device.

The charging circuit may include a divider to scale down a voltage applied to the at least one terminal and a switch to electrically connect or disconnect the at least one terminal to or from the battery, and the controller may control the switch based on the scaled-down voltage. Specifically, the controller may turn on the switch to connect the at least one terminal to the battery when the scaled-down voltage is higher than a preset reference voltage. When the scaled-down voltage is not higher than the preset reference voltage, the controller may move the robot cleaner.

Accordingly, the robot cleaner may charge the battery after determining that the at least one terminal of the robot cleaner makes contact with at least one terminal of the charging device.

The robot cleaner may further include a transmitter for transmitting a signal to the charging device, and the controller may transmit a message to initiate charging to the charging device through the transmitter in response to the at least one object sensor detecting the at least one identification object.

Accordingly, the robot cleaner may notify the charging device that the robot cleaner docks with the charging device.

A charging device may include a charging circuit including at least one terminal having at least a portion exposed to the outside; at least one object sensor arranged separately from the at least one terminal to detect at least one identification object arranged in a robot cleaner; and a controller configured to control the charging circuit to apply a voltage to the at least one terminal in response to the at least one object sensor detecting the at least one identification object.

This may prevent the charging device from applying a voltage to a charging terminal while the charging terminal is exposed to the outside to identify whether the robot cleaner docks with the charging device.

The charging device further includes a signal transmitter for transmitting a guide signal to guide the robot cleaner to the charging device, and the controller may control the transmitter to stop transmitting the guide signal in response to the at least one object sensor detecting the at least one identification object.

Accordingly, the charging device may notify the robot cleaner that the robot cleaner docks with the charging device.

According to an embodiment of the disclosure, provided is a robot cleaner, charging device, and charging system, which is capable of determining whether contact is made between a pair of charging terminals of the charging device and a pair of charging terminals of the robot cleaner.

According to another embodiment of the disclosure, provided is a robot cleaner, charging device, and charging system, which is capable of determining whether contact is made between a pair of charging terminals of the charging device and a pair of charging terminals of the robot cleaner while no voltage is applied by the charging device to its charging terminals.

According to another embodiment of the disclosure, provided is a robot cleaner, charging device, and charging system, which prevents the charging device from applying a voltage to its charging terminals while the charging terminals are exposed to the outside.

Several embodiments have been described above, but a person of ordinary skill in the art will understand and appreciate that various modifications can be made without departing the scope of the disclosure. Thus, it will be apparent to those ordinary skilled in the art that the true scope of technical protection is only defined by the following claims.

Various embodiments of the disclosure have been described above. In the embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more Central Processing Units (CPUs) in a device.

With that being said, and in addition to the above described embodiments, embodiments can thus be implemented through computer readable code/instructions in/on a medium, e.g., a computer readable medium, to control at least one processing element to implement any above described embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disc-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. A robot cleaner comprising:
    a battery;
    a charging circuit including at least one terminal, at least a portion of the at least one terminal being exposed to the outside;
    at least one object sensor configured to detect at least one identification object arranged at a charging device, the at least one object sensor being arranged separately from the at least one terminal; and
    at least one processor configured to control the charging circuit to charge the battery with a voltage applied to the at least one terminal from the charging device in response to the at least one object sensor detecting the at least one identification object,
wherein the charging circuit comprises a divider configured to scale down the voltage applied to the at least one terminal, and
wherein the at least one processor is further configured to move the robot cleaner when the scaled-down voltage is not higher than a reference voltage.

2. The robot cleaner of claim 1, wherein the at least one object sensor comprises at least one hall sensor configured to detect at least one permanent magnet arranged at the charging device.

3. The robot cleaner of claim 1, wherein the at least one object sensor is installed on a front of the robot cleaner, the front being defined based on a direction in which the robot cleaner is headed to the charging device.

4. The robot cleaner of claim 1,
wherein the at least one terminal comprises a pair of terminals, and
wherein the at least one object sensor is arranged between the pair of terminals.

5. The robot cleaner of claim 1,
wherein the charging circuit comprises
a switch configured to electrically connect or disconnect the at least one terminal to or from the battery, and
wherein the at least one processor is further configured to control the switch based on the scaled-down voltage.

6. The robot cleaner of claim 5, wherein the at least one processor is further configured to turn on the switch to connect the at least one terminal to the battery when the scaled-down voltage is higher than athe reference voltage.

7. The robot cleaner of claim 1, further comprising:
a transmitter to transmit a signal to the charging device,
wherein the at least one processor is further configured to control the transmitter to transmit a message to initiate charging to the charging device through the transmitter in response to the at least one object sensor detecting the at least one identification object.

8. The robot cleaner of claim 1, further comprising:
at least one receiver to receive a guide signal transmitted from the charging device,
wherein the at least one processor is further configured to move the robot cleaner to the charging device according to the guide signal.

9. The robot cleaner of claim 8, wherein the at least one processor is further configured to stop the robot cleaner in response to the at least one object sensor detecting the at least one identification object.

10. A charging system comprising:
a robot cleaner including a battery, a first charge circuit including at least one first terminal, and a first docking identifier; and
a charging device including a second charging circuit including at least one second terminal, and a second docking identifier arranged in a position corresponding to the first docking identifier,
wherein the charging device charges the battery with the second charging circuit in response to one of the first or second docking identifier detecting the other of the first or second docking identifier,
wherein the first charging circuit comprises a divider configured to scale down a voltage applied to the at least one first terminal through the at least one second terminal, and
wherein the robot cleaner is further configured to move the robot cleaner when the scaled-down voltage is not higher than a reference voltage until the scaled-down voltage is higher than the reference voltage.

11. The charging system of claim 10, wherein the second docking identifier comprises a permanent magnet and the first docking identifier comprises a hall sensor arranged to detect the permanent magnet by detecting one or more magnetic fields around the permanent magnet.

12. The charging system of claim 11, wherein the robot cleaner includes at least one processor configured to transmit a message to the charging device to charge the battery in response to the hall sensor detecting the permanent magnet.

13. The charging system of claim 10, wherein the first docking identifier comprises a permanent magnet and the second docking identifier comprises a hall sensor arranged to detect the permanent magnet by detecting one or more magnetic fields around the permanent magnet.

14. The charging system of claim 13, wherein the charging device includes at least one processor configured to control the charging device to charge the battery in response to the hall sensor detecting the permanent magnet.

* * * * *